(12) United States Patent
Deaver

(10) Patent No.: US 8,494,288 B2
(45) Date of Patent: Jul. 23, 2013

(54) METHODS FOR DIGITAL IMAGE COMPRESSION

(76) Inventor: F. Scott Deaver, Houston, TX (US)

(*) Notice: Subject to any disclaimer, the term of this patent is extended or adjusted under 35 U.S.C. 154(b) by 771 days.

(21) Appl. No.: 12/571,308

(22) Filed: Sep. 30, 2009

(65) Prior Publication Data

US 2011/0075942 A1    Mar. 31, 2011

(51) Int. Cl.
   *G06K 9/36* (2006.01)
(52) U.S. Cl.
   USPC ............ 382/232; 382/233; 382/240; 382/248
(58) Field of Classification Search
   USPC ................. 382/240, 248, 232, 233, 251, 269, 382/217, 190, 191, 173, 239; 345/501, 605; 348/616; 358/1.16; 375/E7.026, E7.04; 714/799
   See application file for complete search history.

(56) References Cited

U.S. PATENT DOCUMENTS

| 6,343,152 | B1 * | 1/2002 | Chura ........................... 358/1.16 |
| 7,512,281 | B2 * | 3/2009 | Kadowaki ...................... 382/240 |
| 7,778,471 | B2 * | 8/2010 | Kim et al. ...................... 382/232 |
| 2008/0130967 | A1 | 6/2008 | Wang et al. |
| 2009/0154819 | A1 | 6/2009 | Doherty et al. |
| 2011/0075936 | A1 | 3/2011 | Deaver |
| 2011/0075940 | A1 | 3/2011 | Deaver |

* cited by examiner

*Primary Examiner* — Anh Hong Do
(74) *Attorney, Agent, or Firm* — Cardle Patent Law Chtd

(57) ABSTRACT

Methods, systems, and compositions of matter are disclosed herein for the compression of digital image(s) and for the expansion of digital images so compressed. In various aspects, the digital images may be compressed and the compressed images expanded substantially without loss of information.

20 Claims, 16 Drawing Sheets

| 0001 | 0002 | 0003 | 0004 | 0005 | 0006 | 0007 | 0008 | 0009 | 0010 | 0011 | 0012 | 0013 | 0014 | 0015 | 0016 |
|------|------|------|------|------|------|------|------|------|------|------|------|------|------|------|------|
| 0017 | 0018 | 0019 | 0020 | 0021 | 0022 | 0023 | 0024 | 0025 | 0026 | 0027 | 0028 | 0029 | 0030 | 0031 | 0032 |
| 0033 | 0034 | 0035 | 0036 | 0037 | 0038 | 0039 | 0040 | 0041 | 0042 | 0043 | 0044 | 0045 | 0046 | 0047 | 0048 |
| 0049 | 0050 | 0051 | 0052 | 0053 | 0054 | 0055 | 0056 | 0057 | 0058 | 0059 | 0060 | 0061 | 0062 | 0063 | 0064 |
| 0065 | 0066 | 0067 | 0068 | 0069 | 0070 | 0071 | 0072 | 0073 | 0074 | 0075 | 0076 | 0077 | 0078 | 0079 | 0080 |
| 0081 | 0082 | 0083 | 0084 | 0085 | 0086 | 0087 | 0088 | 0089 | 0090 | 0091 | 0092 | 0093 | 0094 | 0095 | 0096 |
| 0097 | 0098 | 0099 | 0100 | 0101 | 0102 | 0103 | 0104 | 0105 | 0106 | 0107 | 0108 | 0109 | 0110 | 0111 | 0112 |
| 0113 | 0114 | 0115 | 0116 | 0117 | 0118 | 0119 | 0120 | 0121 | 0122 | 0123 | 0124 | 0125 | 0126 | 0127 | 0128 |
| 0129 | 0130 | 0131 | 0132 | 0133 | 0134 | 0135 | 0136 | 0137 | 0138 | 0139 | 0140 | 0141 | 0142 | 0143 | 0144 |
| 0145 | 0146 | 0147 | 0148 | 0149 | 0150 | 0151 | 0152 | 0153 | 0154 | 0155 | 0156 | 0157 | 0158 | 0159 | 0160 |
| 0161 | 0162 | 0163 | 0164 | 0165 | 0166 | 0167 | 0168 | 0169 | 0170 | 0171 | 0172 | 0173 | 0174 | 0175 | 0176 |
| 0177 | 0178 | 0179 | 0180 | 0181 | 0182 | 0183 | 0184 | 0185 | 0186 | 0187 | 0188 | 0189 | 0190 | 0191 | 0192 |
| 0193 | 0194 | 0195 | 0196 | 0197 | 0198 | 0199 | 0200 | 0201 | 0202 | 0203 | 0204 | 0205 | 0206 | 0207 | 0208 |
| 0209 | 0210 | 0211 | 0212 | 0213 | 0214 | 0215 | 0216 | 0217 | 0218 | 0219 | 0220 | 0221 | 0222 | 0223 | 0224 |
| 0225 | 0226 | 0227 | 0228 | 0229 | 0230 | 0231 | 0232 | 0233 | 0234 | 0235 | 0236 | 0237 | 0238 | 0239 | 0240 |
| 0241 | 0242 | 0243 | 0244 | 0245 | 0246 | 0247 | 0248 | 0249 | 0250 | 0251 | 0252 | 0253 | 0254 | 0255 | 0256 |

Figure 9

METHODS FOR DIGITAL IMAGE COMPRESSION

BACKGROUND OF THE INVENTION

1. Field

The present disclosure relates to computer software, and, more particularly for computer software for image compression.

2. Description of the Related Art

A wide variety of endeavors may produce large numbers of digital images. In various aspects, significant amounts of computer hardware may be required to store the digital images. The transmission of digital images across networks may require large bandwidth because of the large size digital images may have. Also, because of the large size digital images may have, significant amounts of time may be required to transmit the digital images.

In order to address these problems, digital images may be compressed in order to reduce the size of the digital image that is stored or transmitted. While methods exist for compressing digital images, may existing methods lose information during the compression.

Accordingly, for at least the above reasons, there is a need for methods, systems, and compositions of matter for compressing digital images and that may compress digital images essentially without loss of information.

BRIEF SUMMARY OF THE INVENTION

These and other needs and disadvantages are overcome by the methods, systems, and compositions of matter disclosed herein. Additional improvements and advantages may be recognized by those of ordinary skill in the art upon study of the present disclosure. A computer-implemented method for compression of a digital image is disclosed herein. In various aspects the method includes the steps of generating bit blocks, each bit block comprising one or more bits, dividing a digital image into pixel-blocks, each pixel block including one or more pixels, and mapping uniquely the bits to corresponding pixel blocks. In various aspects, the method may include the steps of setting the bits to a value indicative of a changed pixel within the corresponding pixel block or to a value indicative of no changed pixel within the corresponding pixel block, storing the pixel value of the changed pixel, storing bit-blocks including at least one bit set to the value indicative of the changed pixel within the corresponding pixel block, and discarding bit-blocks having all bits included therein set to the value indicative of the absence of a changed pixel within the corresponding pixel block.

Methods for expanding a compressed image are disclosed herein. In various aspects, the methods may include the steps of dividing at least a portion of a base image into pixel blocks, coordinating a bit block with the pixel blocks; finding a bit in the bit block set to the turned-on bit value, the turned-on bit value indicating the pixel block mapped to the bit includes one or more changed pixels, and updating the one or more changed pixels with changed pixel values.

This summary is presented to provide a basic understanding of some aspects of the methods disclosed herein as a prelude to the detailed description that follows below. Accordingly, this summary is not intended to identify key elements of the methods, systems, and compositions of matter disclosed herein or to delineate the scope thereof.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 9 illustrates the exemplary digital image of FIG. 4 at a second level of processing by the exemplary method of FIGS. 3A and 3B;

Figure 1A:
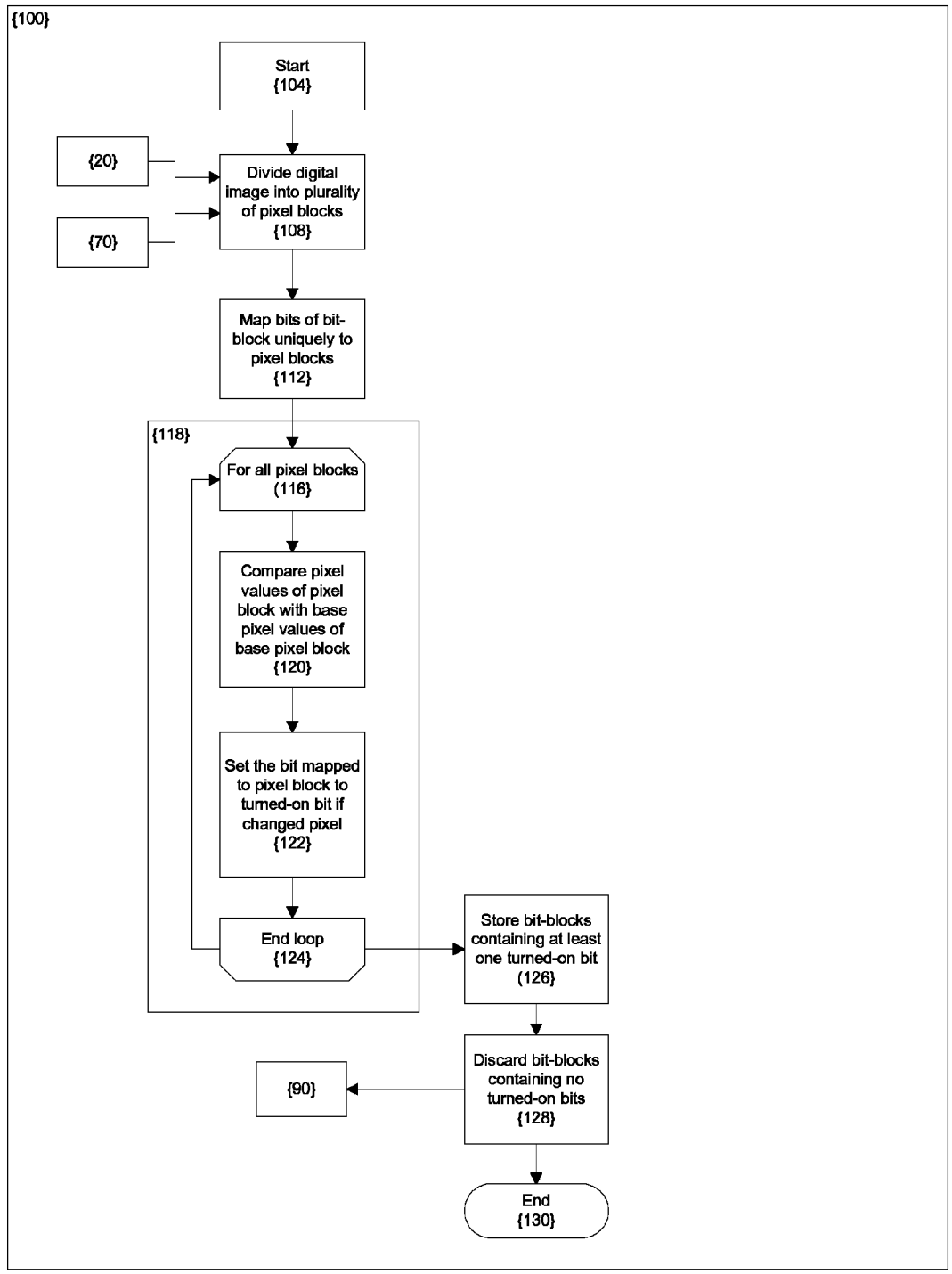
FIG. 1A illustrates by flow chart an exemplary method for compressing a digital image.

The Figures are exemplary only, and the implementations illustrated therein are selected to facilitate explanation. The number, position, relationship and dimensions of the elements shown in the Figures to form the various implementations described herein, as well as dimensions and dimensional proportions to conform to specific force, weight, strength, flow and similar requirements are explained herein or are understandable to a person of ordinary skill in the art upon study of this disclosure. Where used in the various Figures, the same numerals designate the same or similar elements. Furthermore, when the terms "top," "bottom," "right," "left," "forward," "rear," "first," "second," "inside," "outside," and similar terms are used, the terms should be understood in reference to the orientation of the implementations shown in the drawings and are utilized to facilitate description thereof.

DETAILED DESCRIPTION OF THE INVENTION

A method of compression of one or more digital images is disclosed herein. In various aspects, the method may allow for the compression of digital images wherein the digital images are generated serially in time or sequentially along some spatial coordinate(s). The method may be essentially lossless. The digital image(s) may include the image projected on at least a portion of a computer screen in various aspects.

In various aspects, the method divides the digital image into a plurality of pixel-blocks. Each pixel-block of the plurality includes one or more pixels, and each pixel has an associated pixel value indicative of the color, shade, and/or other attribute or combination of attributes of the pixel. In various aspects, the methods disclosed herein may be used to store digital images of computer screens as disclosed in U.S. patent application Ser. No. 12/571291 entitled "METHODS FOR MONITORING USAGE OF A COMPUTER" by F. Scott Deaver, filed on the same date as the present application, and which is hereby incorporated by reference in its entirety herein. The method proceeds by mapping bits within a bit-block to pixel-blocks such that a specific bit maps to a specific pixel-block. A bit-block may be, for example, a nybble having 4 bits, an 8-bit byte, a 16-bit unsigned short, a 32-bit word, a 64-bit word, and so forth. Each bit in a bit-block is mapped uniquely to a corresponding pixel-block, so that there is a one-to-one correspondence between the bit and the pixel-block. Each pixel-block maps uniquely to a specific bit and, unless there are excess bits, each bit maps uniquely to a specific pixel-block, so that there is a one-to-one correspondence between the bits and the pixel-blocks.

The method continues by comparing the pixel-blocks of the digital image with base pixel-blocks in a base image. The pixels in the base pixel-blocks have associated base pixel values. Each pixel-block is compared with the base pixel-block in the base image that includes the same pixels. Depending upon the comparison, the bit that is mapped to the pixel-block may be set between a turned-off bit value and a turned-on bit value. For example, if the pixels within the pixel-block have pixel values generally equal to the base pixel values of the base pixel-block, the bit that is mapped to the pixel-block may be set to a turned-off bit value. If, per this example, one or more of the one or more pixels within the pixel-block have a pixel value that differs from the base pixel value of the same pixel(s) in the base pixel-block, the bit that is mapped to the pixel-block may be set to a turned-on bit value. The pixel values of the pixels within the pixel-block mapped to the bit having the turned-on bit value are stored in some aspects, while, in other aspects, pixel difference values—the difference between the pixel value and the base pixel value—are stored. All of the pixel values or pixel difference values within the pixel-block mapped to the bit having the turned-on bit value may be stored, in some aspects, or, in other aspects, only the pixel values (or non-zero pixel difference values) that differ from the base pixel values are stored.

The steps of comparing pixel-blocks of the digital image with base pixel-blocks in a base image and setting the bit mapped to the pixel-block set to a turned-on bit value when appropriate are repeated until all of the pixel blocks of the digital image have been compared with the corresponding base pixel-block in the base image and the bits mapped to the pixel-blocks have been set between a turned-on bit value or a turned-off bit value. Then, the method proceeds by storing bit-blocks having one or more bits set to the turned on bit value and discarding bit-blocks having no bits set to the turned-on bit value thereby producing a compressed image.

The compressed image may be expanded by dividing at least a portion of a base image into pixel blocks, and coordinating a bit block with the pixel blocks. The method may proceed by finding a bit in the bit block set to the turned-on bit value, the turned-on bit value indicating the pixel block mapped to the bit includes one or more changed pixels, and then updating the one or more changed pixels with changed pixel values thereby producing the expanded image.

The methods disclosed herein may be implemented, in some aspects, in software having the form of computer readable instructions adapted to execute upon one or more computers to cause the one or more computers to implement the steps of the methods. Software may be, for example, in the form of high-level code such as C or Java, or may be in the form of machine code. In some aspects, the software may execute on one computer. In other aspects, two or more computers may communicate with one another via network, and the software may be organized in various ways such that portions of the software may be distributed over the two or more computers to be executed by the two or more computers. In some aspects, at least portions of the methods disclosed herein may be implemented through logic circuits.

The software may be configured into modules, and the modules may be organized in various ways in various aspects. Modules include routines, programs, components, data structures, etc., that perform particular tasks or implement particular abstract data types. Although generally described as implemented by software, the methods disclosed herein may be implemented in combination with other program modules and/or as a combination of hardware and software in various aspects.

As used herein, the terms "component" and "system" are intended to refer to a computer-related entity, either hardware, a combination of hardware and software, software, or software in execution. For example, a component may be a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Computer includes a general-purpose computer with one or more processors, memory, computer screen(s), mouse, keyboard, storage device(s), and so forth. Computer screen includes one or more computer screens in communication with the computer that may be generally viewed by the user. Computer further includes, for example, single-processor or multiprocessor computers, minicomputers, mainframe computers, as well as personal computers, hand-held computing devices, cellular telephones that include a microprocessor, and microprocessor-based or programmable consumer electronics.

The compositions of matter disclosed herein include computer readable media. Computer readable media can be any available media that can be accessed by the computer and includes both volatile and non-volatile media, removable and non-removable media. For example, computer-readable media includes computer storage media and communication media. Computer readable media includes volatile media, non-volatile media, removable media, and non-removable media implemented in any method or technology for storage of information such as computer-readable instructions, data structures, program modules or other data. Computer readable media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium that can be used to store the information and that can be accessed by the computer. Computer readable media includes computer-readable instructions, data structures, program modules or other data in a modulated data signal such as a carrier wave or other transport mechanism. The term "modulated data signal" means a signal that has one or more of its characteristics set or changed in such a manner as to encode information in the signal. Logic circuit(s) generally configured to carry out one or more steps of the methods disclosed herein are included in computer readable media.

As would be recognized by those of ordinary skill in the art upon study of this disclosure, the methods, systems, and compositions of matter disclosed herein may be practiced in a distributed computing environment where certain tasks are performed by processors that are linked by network. In a distributed computing environment, modules can be located in computer readable media distributed about the network, and various processors located about the network may execute the modules. The modules and/or processors may communicate with one another via the network.

EXAMPLE I

Figure 1B:
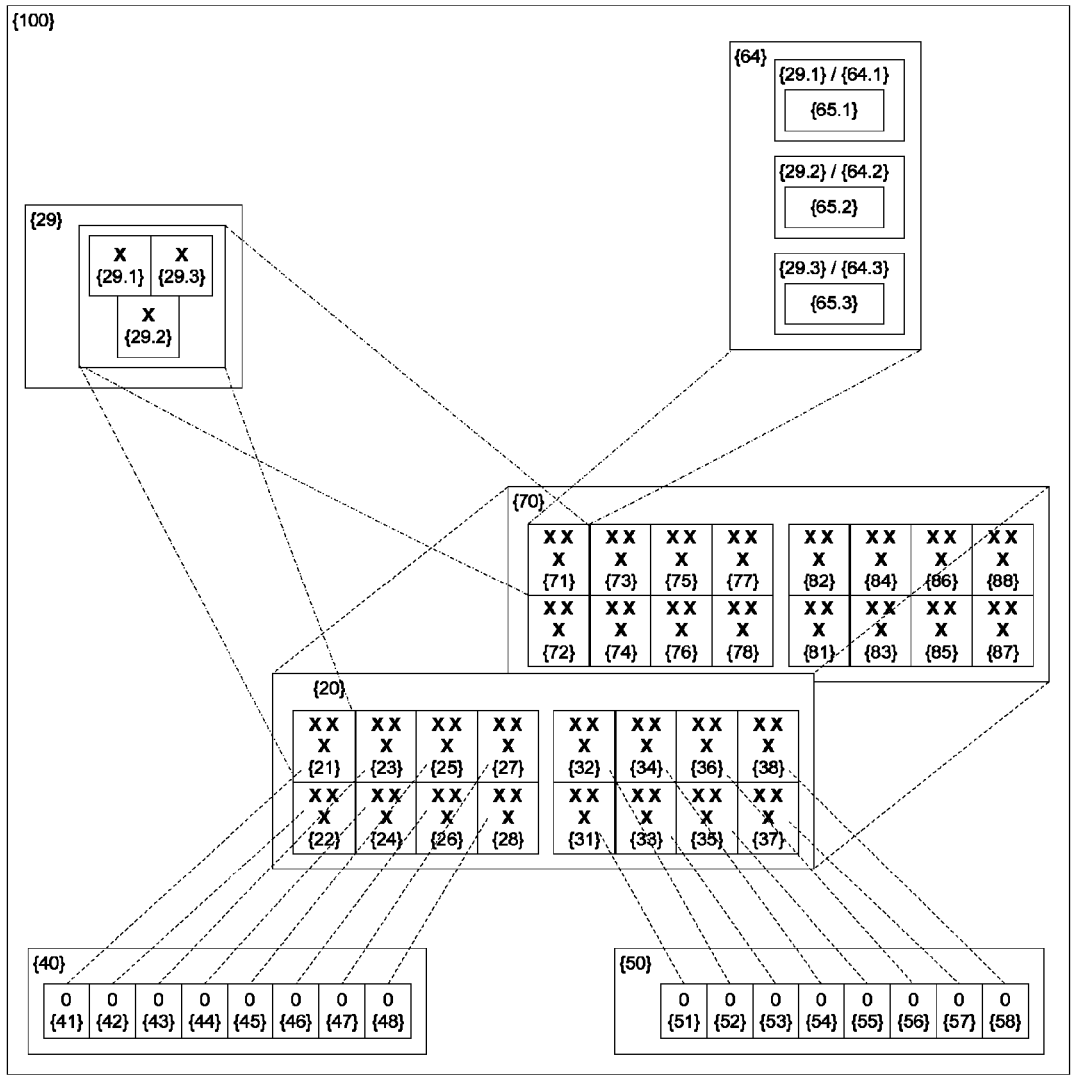
FIG. 1B illustrates by schematic diagram portions of the exemplary method for compressing a digital image of FIG. 1A.

FIGS. 1A to 1D illustrates method 100 that compresses digital image 20 into compressed image 90. As illustrated in FIG. 1A, method 100 is entered at step 104. At step 108, the digital image 20 is divided into pixel-blocks 21-28, 31-38, as illustrated in FIG. 1B. Each pixel bock, such as pixel-blocks 21-28, 31-38, contains one or more pixels 29. For example, in this implementation, pixel-block 21 contains pixels 29.1, 29.2, 29.3.

Method 100 proceeds from step 108 to step 112, and, at step 112, the bits 41-48, 51-58 within bit-blocks 40, 50 are mapped uniquely to the pixel-blocks 21-28, 31-38. In this implementation, bit-blocks 40, 50 are represented as 8-bit bytes. At step 108, each of bits 41-48 in bit-block 40 and each of bits 51-58 in bit-block 50 are mapped uniquely to a corresponding pixel-block of pixel-blocks 21-28, 31-38, so that there is a one-to-one correspondence between each of bits 41-48, 51-58 and pixel-blocks 21-28, 31-38. For example, bit 41 is mapped uniquely to pixel-block 21, bit 42 is mapped uniquely to pixel-block 22, and so on, as illustrated in FIG. 1B.

Method 100 proceeds from step 112 to loop 118 that comprises steps 116, 120, 122, 124. In loop 118, the pixel-blocks 21-28, 31-38 of the digital image 20 are compared with base pixel-blocks 71-78, 81-88 in base image 70. Base image 70 is positioned apart from digital image 20 along the axis (indicated by dashed line), as illustrated in FIG. 1B, where the axis may be indicative of the location of digital image 20 and base image 70 in time or space—i.e. may be either a temporal or spatial dimension. In other implementations, the digital image 20 and the base image 70 may be related to one another both temporally and spatially or in ways other than temporally or spatially. Base image 70 is an image that the compression of digital image 20 is, in some sense, derivative of. In various implementations, base image 70 may occur at any temporal position with respect to digital image 20 (i.e. either earlier in time or later in time with respect to digital image 20) and/or base image 70 may occur at any spatial position relative to digital image 20.

Base image 70, in Example I, includes base pixel-blocks 71-78, 81-88, and each of base pixel-blocks 71-78, 81-88 contains one or more pixels 29. Base image 70 is divided into base pixel-blocks 71-78, 81-88 in the same way as digital image 20 is divided into pixel-blocks 21-28, 31-38 so that there is a one-to-one correspondence between pixel-blocks 71-78, 81-88 in base image 70 and pixel-blocks 21-28, 31-38 in digital image 20. For example, base pixel-block 71 in base image 70 corresponds to pixel-block 21 in digital image 20, and pixel block 21 and base pixel-block 71 include the same pixels 29.1, 29.2, 29.3.

Figure 1C:
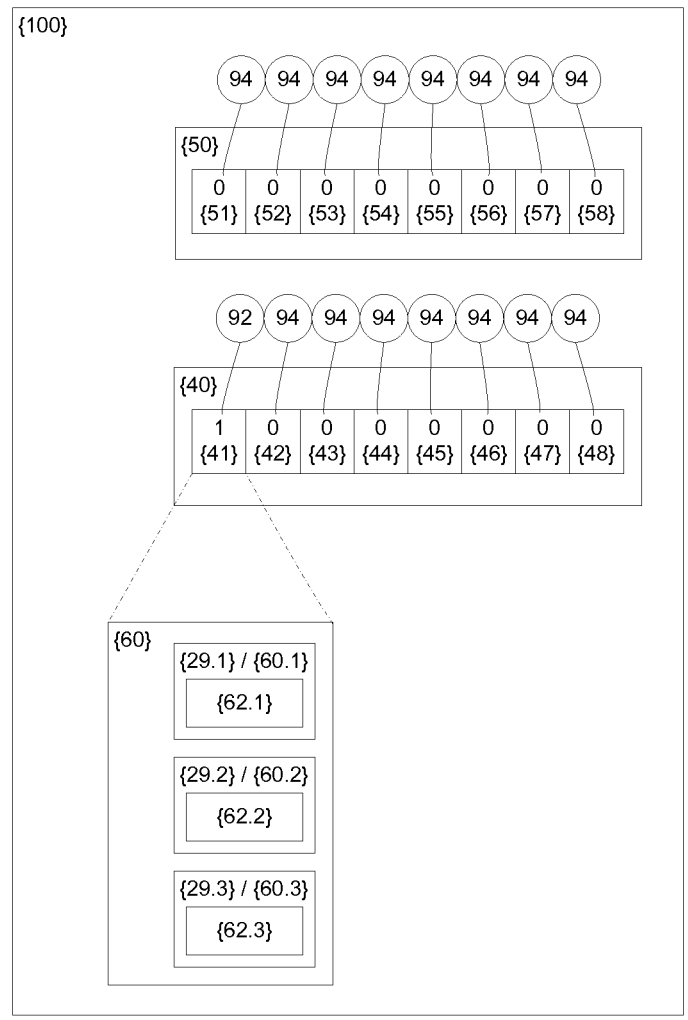
FIG. 1C illustrates by schematic diagram portions of the exemplary method for compressing a digital image of FIG. 1A.

The pixels 29 in base pixel-blocks 71-78, 81-88 of base image 70 have base pixel values 64, and the pixels 29 in pixel-blocks 21-28, 31-38 of digital image 20 have pixel values 60. To illustrate this point, pixels 29.1, 29.2, 29.3 are shown as having pixel values 60.1, 60.2, 60.3 and base pixel values 64.1, 64.2, 64.3, respectively. Pixel value 60.1 is held in one 8-bit byte 62.1, pixel value 60.2 is held in one 8-bit byte 62.2, and pixel value 60.3 is held in one 8-bit byte 62.3 in this implementation, as illustrated in FIG. 1C. Pixels 29.1, 29.2, 29.3 have base pixel values 64.1, 64.2, 64.3, respectively. Base pixel value 64.1 is held in one 8-bit byte 65.1, base pixel value 64.2 is held in one 8-bit byte 65.2, and base pixel value 65.3 is held in one 8-bit byte 65.3, as illustrated in FIG. 1B. In the implementation of FIGS. 1A to 1D, the pixel values 60 and the base pixel values 64 are 256-grayscale, but may have other grayscale or color attributes as well as other attributes and may be of various bit sizes in various other implementations.

At step 120, the pixel values 60 of each pixel 29 of each of pixel-blocks 21-28, 31-38 in the digital image 20 are compared with the corresponding base pixel values 64 of the corresponding base pixel-block 71-78, 81-88 in the base image 70 that includes the same pixels 29. For example, pixel-block 21 corresponds to base pixel-block 71 as both pixel-block 21 and base pixel bock 71 include pixels 29.1, 29.2, 29.3, so that pixel value 60.1 is compared with base pixel value 64.1, pixel value 60.2 is compared with base pixel value 64.2, and pixel value 60.3 is compared with base pixel value 64.3 at step 120. Depending upon the comparison, bit 41 of bit-block 40, which is uniquely mapped to pixel-block 21 and, therefore uniquely mapped to pixel-block 71, is set to either the turned-on bit value 92 or a turned-off bit value 94. In this implementation, the turned-on bit value is represented by a 1 value and the turned-off bit value is represented by a 0 value, which is arbitrary and may be reversed in other implementations. The turned-on bit value 92 is indicative of a difference in pixel values between the base image and the digital image such as, for example, a difference between at least one of pixel values 60.1, 60.2, 60.3 and base pixel values 64.1, 64.2, 64.3, respectively. The turned-off bit value 94 is indicative that pixel values between the base image and the digital image are substantially the same such as, for example, no difference between pixel values 60.1, 60.2, 60.3 and base pixel values 64.1, 64.2, 64.3, respectively. At step 120, per this example, at least one of pixel value 60.1, 60.2, 60.3 differs from base pixel value 64.1, 64.2, 64.3, respectively, so that bit 41 of bit-block 40 is set to a turned-on bit value 92 at step 122, as illustrated in FIG. 1C, and all the pixel values 60.1, 60.2, 60.3 of pixels 29.1, 29.2, 29.3 of pixel-block 21 are stored as stored pixel values 68. In other implementations, only the pixel value(s) 60.1, 60.2, 60.3 that differ from the base pixel value(s) 64.1, 64.2, 64.3 are stored. The pixel values 60.1, 60.2, 60.3 are stored as stored pixel values 68.1, 68.2, 68.3 (see FIG. 1D). The stored pixel values 68 are associated with the bit 41 having the turned-on bit value 92 such that, for any bit 41 having the turned-on bit value 92, the associated stored pixel values 68 may be found. For example, bit 41 of bit-block 40 is associated with stored pixel values 68.1, 68.2, 68.3.

Loop 118 passes from step 122 to step 124, which ends loop 118. Loop 118 loops between steps 116, 120, 122, and 124 until all the pixel values 60 of pixel-blocks 21-28, 31-38 have been compared with the corresponding base pixel values 64 of the corresponding base pixel-blocks 71-78, 81-88. As loop 118 progresses, pixel values 60 of the pixels 29 of pixel-block 23 are compared with the base pixel values 64 of pixels 29 of base pixel-block 73, pixel values 60 of the pixels 29 of pixel-block 25 are compared with the base pixel values 64 of pixels 29 of base pixel-block 75, and so on. When all the pixel values 60 of pixel-blocks 21-28, 31-38 have been compared with the corresponding base pixel values 64 of the corresponding base pixel-blocks 71-78, 81-88, method 100 passes out of loop 118 at step 124 to step 126.

FIG. 1C illustrates bit-blocks 40, 50 as method 100 passes from step 124 to step 126. Bit 41, which is set to turned-on bit 92, indicates that at least one of the pixel values 60 of pixels 29 in pixel-block 21 differ from the base pixel values 64 of base pixel-block 71. Bits 42-48 of bit-block 40 and bits 51-58 of bit-block 50 are set to the turned-off bit value 94, which indicates no change between the pixel values 60 of pixel-blocks 22-28, 31-38 and base pixel values 64 of base pixel-blocks 72-78, 81-88.

Figure 1D:
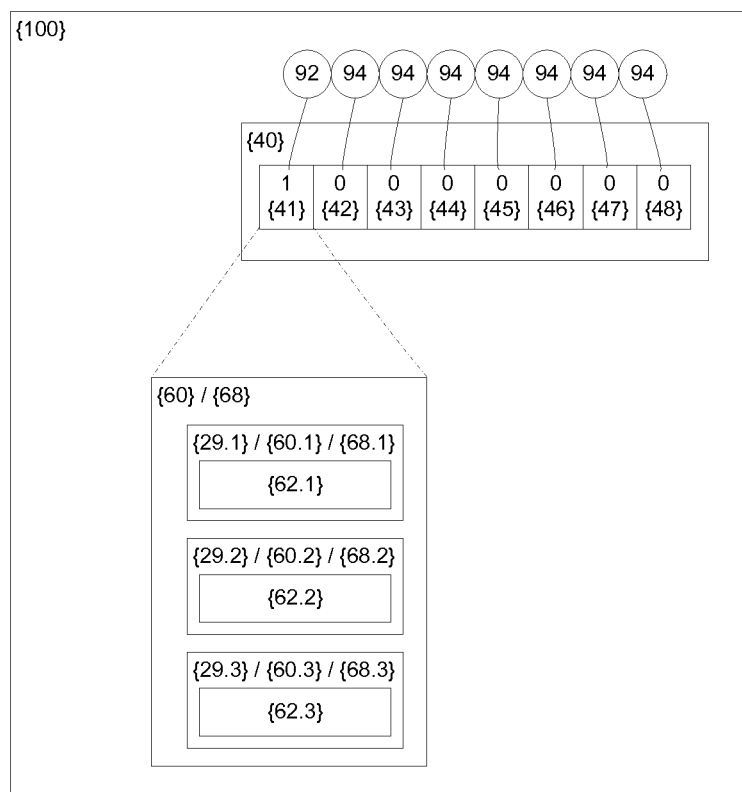
FIG. 1D illustrates by schematic diagram portions of the exemplary method for compressing a digital image of FIG. 1A.

At step 126, method 100 stores bit-blocks, such as bit-block 40, having one or more turned-on bits 92 and discards bit-blocks, such as bit-block 50, having only bits 51-58 set to the turned-off bit value 94 and no bits 51-58 set to the turned-on bit value, as illustrated in FIGS. 1C, 1D, which effectively compresses digital image 20 into compressed image 90. No information is lost, as the information exists either in the base image 70 or in the stored pixel values 68. The method may achieve more compression when variations between digital image 20 and base image 70 are not large—i.e. the majority of pixel values 60 in the digital image 20 are equal to the corresponding base pixel values 64 in base image 70. The method 100 may be applied to successive images, which would be compressed in succession. For example, a series of successive images may be compressed using the base image wherein each image of the successive images includes a small number of changed pixels when compared with the base image.

Figure 2:
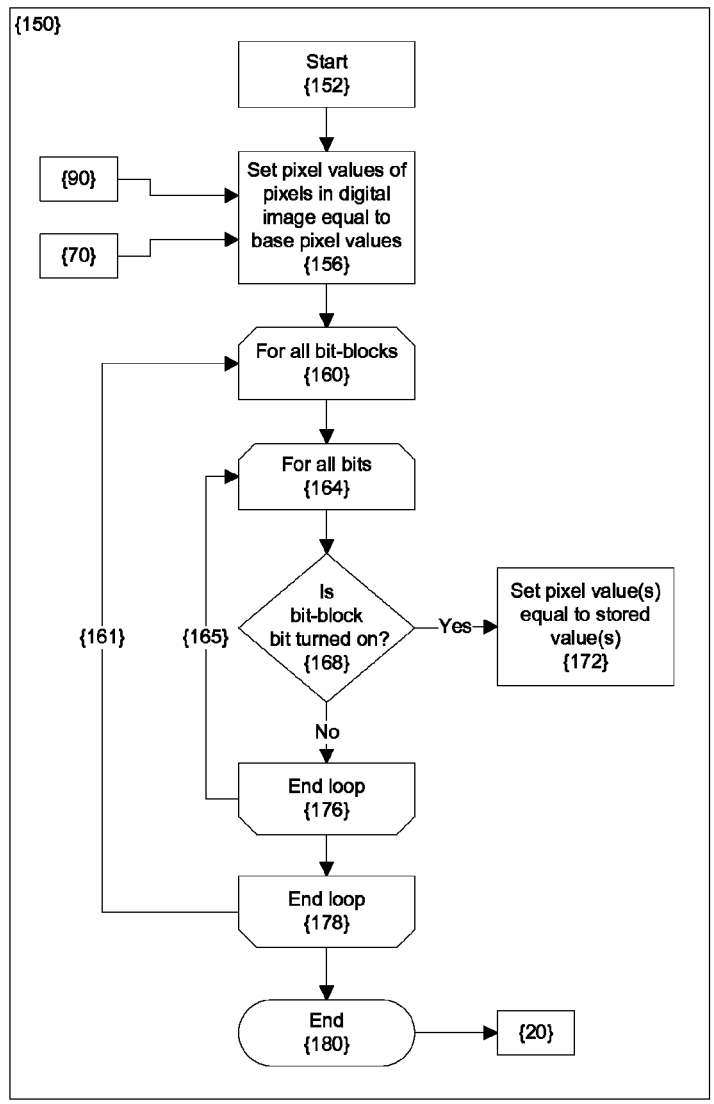
FIG. 2 illustrates by flow chart an exemplary method for expanding a compressed image.

In order to restore digital image 20 from compressed image 90 in Examples I, method 150, which is illustrated by flow-chart in FIG. 2, begins at step 152. Compressed image 90 was compressed by method 100 illustrated in FIGS. 1A to 1D. Using the base image 70, the method 150 sets all pixel values 60 of the pixels 29 in the digital image 20 equal to the base pixel values 64 in the base image 70 at step 156. For example, pixel values 60.1, 60.2, 60.3 of pixels 29.1, 29.2, 29.3 are set equal to base pixel values 64.1, 64.2, 64.3. Upon completion of step 156, the digital image 20 replicates base image 70. Pixel blocks 21-28, 31-38 are regenerated in the digital image 20 and bit block 40 is coordinated with pixel blocks 21-28 so that each bit 41-49 of bit block 40 is mapped to the corresponding pixel block 21-28.

Method 150 passes from step 156 to nested loops 161, 165 that begin at steps 160, 164 and end at steps 176, 178, respectively. Loop 160 loops through all bit blocks such as bit block 40 that have been saved as part of the image compression. Note that only bit-blocks with at least one bit 41-48, 51-58 set to the turned-on bit value 92 are saved during image compression, so that, per the example of method 100, only bit-block 40 was saved and loop 161 will loop once.

Loop 165 loops through all of the bits for each bit-block, for example, bits 41-48 of bit-block 40 to check for bits set to the turned-on bit value 92. Upon detecting that the bit, such as bit 41 in this example, is set to the turned-on bit value 92, method 150 sets the pixel values 60 of the pixels 29 in the pixel block that the bit maps to equal to the stored pixel values 68 associated with the bit. In this example, bit 41 is set to the turned-on bit value 92 and bit 41 is mapped to pixel block 21 so that pixel values 60.1, 60.2, 60.3 of pixels 29.1, 29.2, 29.3 in pixel block 21 are set to the stored pixel values 68.1, 68.2, 68.3. Upon completion of loops 161, 165, digital image 20 is decompressed, and method 150 terminates at step 180.

EXAMPLE II

Figure 3A:
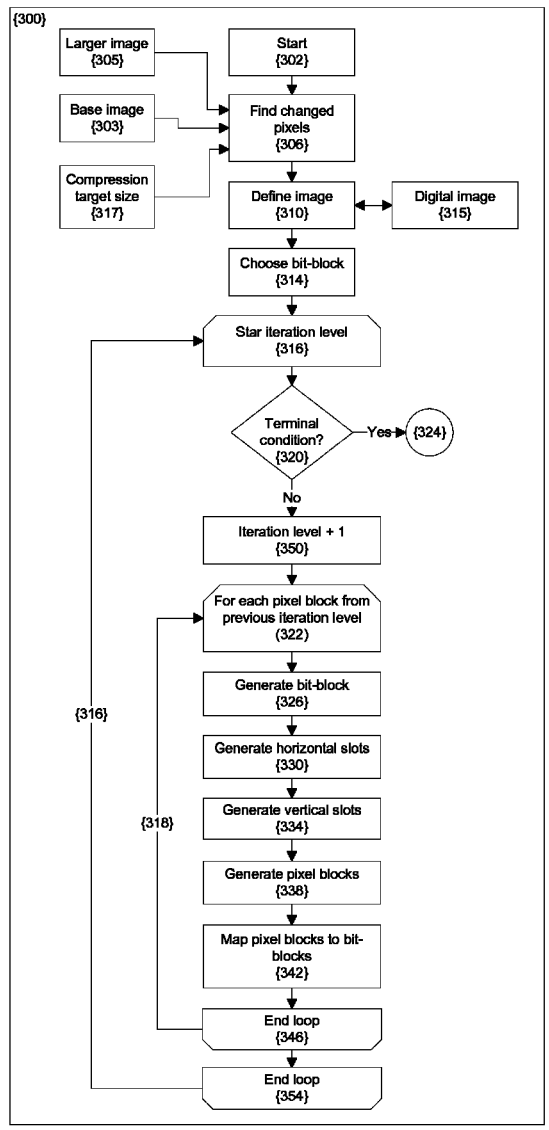
FIG. 3A illustrates by flow chart an exemplary method for compressing a digital image.
Figure 3B:
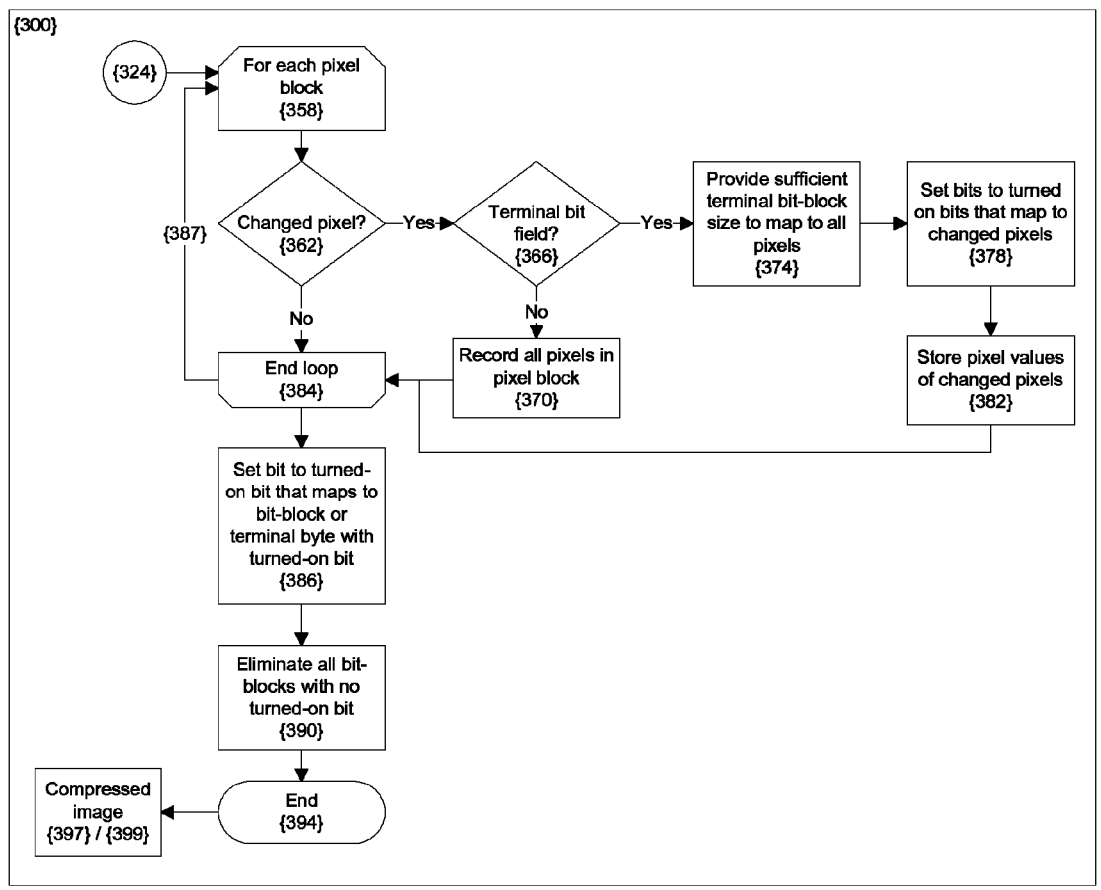
FIG. 3B is a continuation of the flow chart of FIG. 3A.

In Example II, method 300, which compresses larger image 305 into compressed image 397, is generally illustrated by flow chart in FIGS. 3A and 3B. A larger image 305 and a base image 303 are inputs into method 300, as illustrated. Method 300 begins at step 302 and proceeds from step 302 to step 306. At step 306, the larger image 305 is compared with the base image 303 to find changed pixels 339, where changed pixels 339 have a pixel value in the larger image 305 that differs from the base pixel value in the base image 303.

Figure 4:
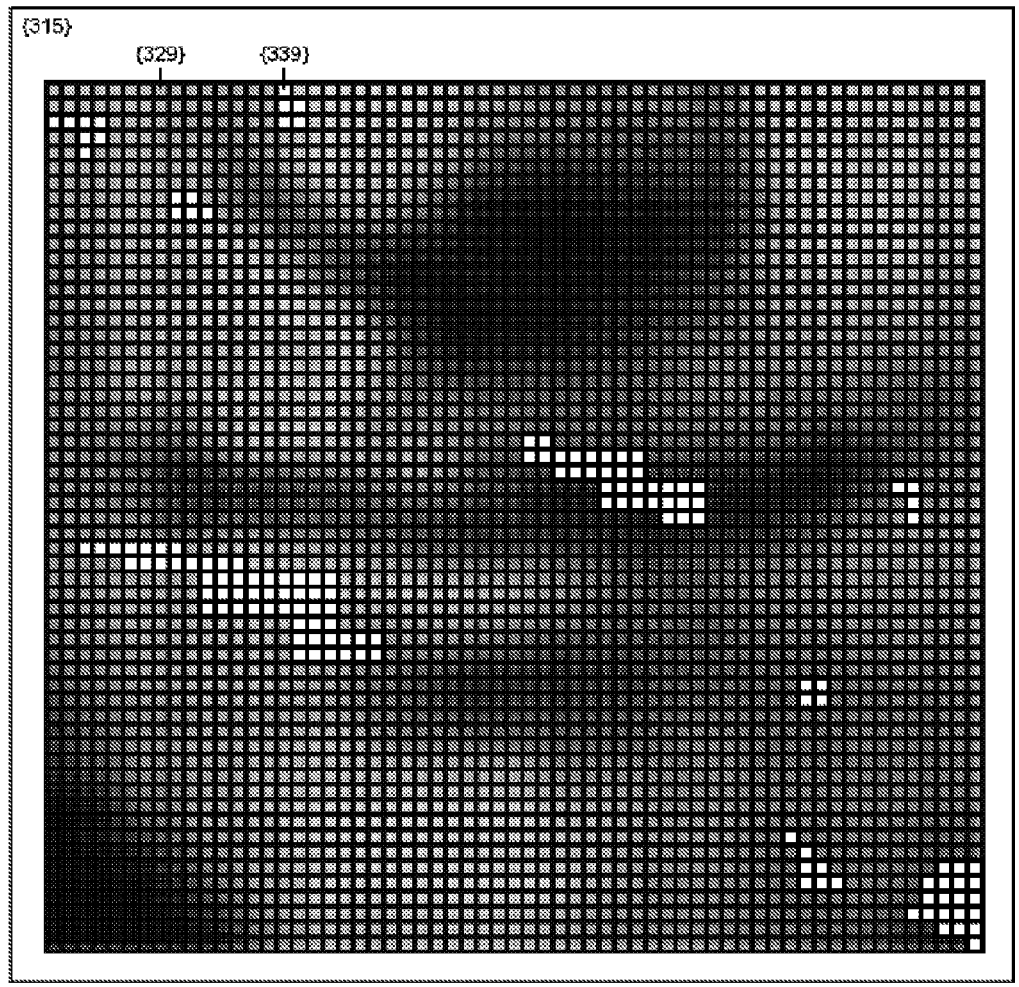
FIG. 4 illustrates an exemplary digital image to be compressed by the exemplary method of FIGS. 3A and 3B.

At step 310, digital image 315 is defined from the larger image 305 such that the digital image 315 forms the smallest rectangle that encloses all of the changed pixels 339 in the larger image 305. There are no changed pixels 339 in the larger image 305 that fall outside the boundaries of the digital image 315. In some implementations, the digital image 315 may include the entirety of the larger image 305, while, in other implementations, the digital image 315 may include portions of the larger image 305. Exemplary digital image 315 is illustrated in FIG. 4 with the changed pixels 339 illustrated in white. Per the methods disclosed herein, there is no need to store parts of larger image 305 that have not changed from the base image 303.

In larger image 305, base image 303, and digital image 315, the pixels are 256-grayscale in Example II, but may have other representations in other implementations. When comparing pixel values of a pixel 329 between the larger image 305 and a base image 303 to determine whether or not the pixel 329 is a changed pixel 339 at step 306, the 256-grayscale pixels 329 of the base image 303 are compared to the 256-grayscale pixels 329 of the larger image 305. A pixel tolerance having a value between 0 and 255 is used in method 300, and pixels 329 are deemed to be changed pixels 339 if the absolute value of the difference between the pixel value and the base pixel value of the pixel 329 exceeds the pixel tolerance. For lossless compressions, the pixel tolerance will have a value of 0.

In some implementations, color images may be converted to grayscale and compared in this manner. In other implementations, color images may be compared directly. Color images, such as a color image captured from a computer screen, may be in, for example, 24-bit color. Since 24-bit color is not linear, a tolerance value may not be used to identify colors in close proximity to one another. In order to compress the color image, the color image is converted into a 256-grayscale image (single-byte-per pixel) in various implementations. This 256-greyscale image is generally linear, and pixels that have changed can then be found based upon the pixel tolerance. The base image, such as base image 303, may be retained in the 256-grayscale format. All comparisons and math functions may be performed between the 256-grayscale pixels of the base image 303 and the 256-grayscale pixels of the digital image 315. When a pixel difference is found between grayscale comparison pixels and the desired output is in color, color can be provided by several methods. In various implementations, color may be supported in at least two ways. The 24-bit color pixel found in the same location of the color image as the location of the different grayscale pixel of the current image can be reduced to a single-byte color pixel. This can be done by scaling the byte representing red in the 24-bit color to two bits (meaning four possible values for red can be supported) and shifting those bits shifted into the leftmost two bits of the output byte, then scaling the byte representing green in the 24-bit color to 3 bits (meaning eight possible values for green can be supported) and shifting those bits into the middle three bits of the output byte, and finally scaling the byte representing blue in the 24-bit color to 3 bits (meaning eight possible values for blue can be supported) and shifting those bits into the rightmost three bits of the output byte. The output byte can then be stored in place of the grayscale pixel. The second method provided to support color requires quantizing the colors of the color version of the current image—that is, mapping all colors in the image to the most popular 256 colors that occur within the image. As each different current grayscale pixel is found, the 24-bit color pixel in the same location of the color image as the location of the different grayscale pixel of the current image is retrieved. That 24-bit color is then mapped to a 256-value single-byte index into its corresponding quantized color, and the quantized color index is then stored in place of the current grayscale pixel value. The quantized colors are referenced by a stored color index and are appended to the end of the compressed output.

The digital image 315 in Example II, as illustrated in FIG. 4, is 61 pixels 329 wide and 57 pixels 329 in height, and contains 256-grayscale pixels. There are 10,431 (61 times 57) pixels in the original color image (not shown) from which digital image 315 is derived, and each color pixel in the original color image is three bytes (24 bits) in size. Prior to applying any compression algorithms, the starting file size is 10,431 bytes.

There are 142 changed pixels 339 (142 bytes) in digital image 315. Four bytes (two unsigned shorts) are required to specify the height and width of the digital image 315, and another four bytes are required to store the digital image's 315 horizontal and vertical position within the larger image 305.

A compression target size 317 is passed into the method 300. The compression target size 317 represents the smallest file size of the compressed files produced by other compression methods applied previously to the larger image 305. If at any point in the compression process the results set size produced by compression method 300 equals or exceeds the compression target size, 317 the method 300 is aborted in order to prevent overflow.

After defining the digital image 315 at step 310, method 300 proceeds to step 314. The bit-bit-block representation for the bit-block 340 [(see FIG. 8) is selected at step 314. In various implementations, the bit-block representation for the bit-block 340 is natural to the computer transfer data size (usually 32 or 64 bits) and fits the digital image 315. For digital images such as digital image 315, bit-blocks 340 with bit-block representations that represent rectangular regions may be chosen, and bit-blocks 340 with bit-block representations that represent squares may be chosen for digital images that are reasonable square. Accordingly, in various implementations, the bit block representation for the bit block 340 may be chosen from the following at step 314:

4-bit nybble (half of a byte) can store a bit-block representing 2 bits for height and 2 bits for width 8-bit byte (asymmetrical)—2 bits for width, 4 bits for height 8-bit byte (asymmetrical, alternate)—4 bits for width, 2 bits for height 16-bit unsigned short integer—4 bits for height and 4 bits for width 32-bit unsigned short (asymmetrical)—4 bits for width, 8 bits for height 32-bit unsigned short (asymmetrical, alternate)—8 bits for width, 4 bits for height An unsigned 64-bit integer, which can store a bit-block representing 8 bits for height and 8 bits for width.

Asymmetrical indexes (such as 2 bits by 8 bits to accommodate 32-bit indices) can also be used The different bit-block representations for the bit-block 340 may produce different results in terms of the files size of the resulting compressed image 397 because the changed pixels 339 may be aligned differently with the bit blocks 340 depending upon bit-block representations. Larger bit-blocks representations may be more efficient when the number of changed pixels 339 in the digital image 315 is small, and less efficient when the changed pixels 315 are widely dispersed throughout the digital image 315.

In various implementations, method 300 is executed multiple times, using, for example, the following alternative bit block representations for bit-block 340: 4-bit nybble (2 bits for width, 2 bits for height); 8-bit byte (2 bits for width, 4 bits for height); 8-bit byte (4 bits for width, 2 bits for height); 16-bit unsigned short (4 bits for width, 4 bits for height); 32-bit unsigned short (4 bits for width, 8 bits for height); 32-bit unsigned short (8 bits for width, 4 bits for height); and 64 bit unsigned integer (8 bits for width, 8 bits for height). The output files 399 (FIG. 3B) generated using the alternative bit block representation in method 300 are then compared and the output file 399 having the smallest output file size is then selected as the compressed image 397. For the purposes of this Example, the unsigned short (16-bit) bit block representation for the bit-block 340 is selected at step 314, and only this bit block representation is used in Example II.

Figure 5:
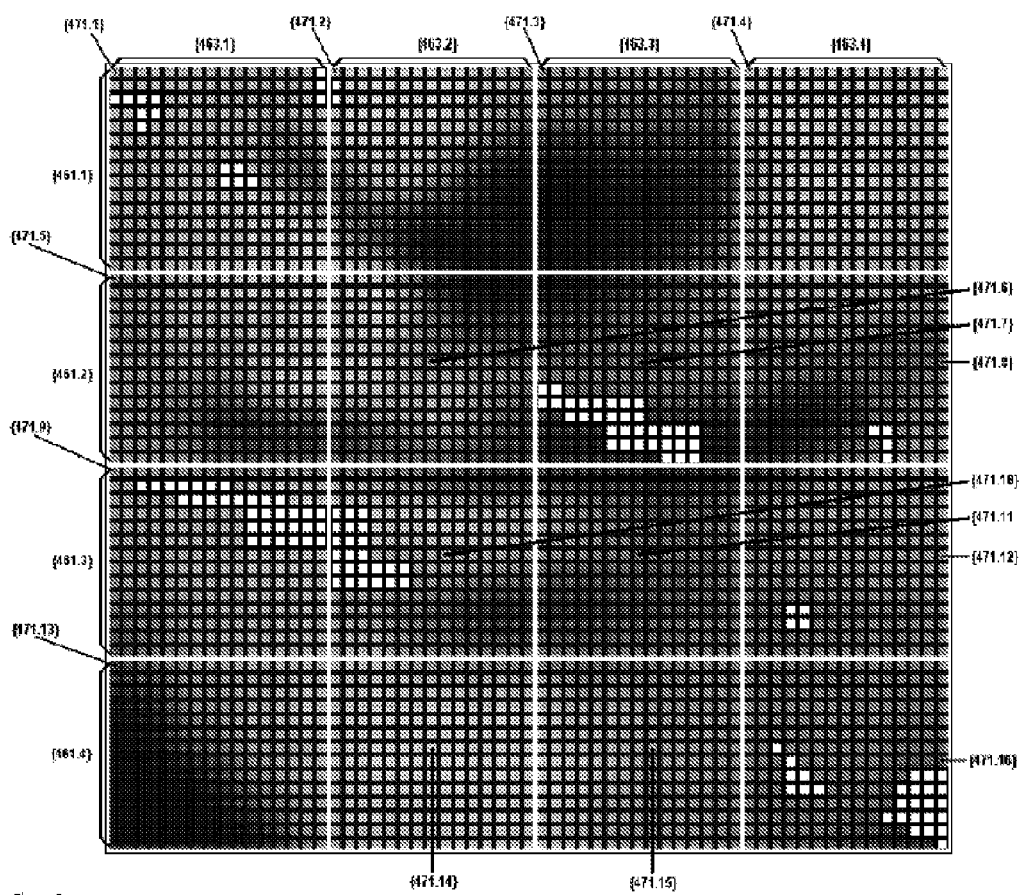
FIG. 5 illustrates the exemplary digital image of FIG. 4 at a first level of processing by the exemplary method of FIGS. 3A and 3B.

Having chosen a representation for the bit-block 340 at step 314, method 300 proceeds to nested loops 316, 318, with loop 318 nested within loop 316. An iteration level in method 300 is the number of progressions through loop 316, so that the first iteration level would be the first progression through loop 316, the second iteration level would be the second progression through loop 316, and so forth. At each iteration level, the digital image 315 is divided into horizontal slots 461 and divided into vertical slots 463 such as horizontal slots 461.1, 461.2, 461.3, 461.4 and vertical slots 463.1, 463.2, 463.3, 463.4 in order to divide the digital image into pixel blocks 471 such as pixel blocks 471.1-471.16 (see FIG. 5). The intersections of the horizontal slots 461 and the vertical slots 463 form the pixel blocks 471, as illustrated in FIG. 5. The horizontal slots 461, vertical slots 463, and, hence, the pixel blocks 471 are outlined in white in FIG. 5.

At step 320, which is at the start of loop 316, method 300 checks for the terminal condition. For convenience and clarity of presentation, the terminal condition will be discussed further on in this disclosure.

If the terminal condition is not found at step 320, method 300 passes from step 320 to step 350 where the iteration level is increase by 1 (the first iteration level is iteration level 1) and then to step 322, which is the start of loop 318. Loop 318 loops once for each pixel block 371 in the digital image 315 from the previous iteration level.

Loop 318 includes steps 322, 326, 330, 334, 338, 342, 346. At step 326, a bit block 340 is generated. At step 330 horizontal slots 461 are generated—one horizontal slot 461 is generated for each bit 341 that represents height in the bit block 340. Vertical slots 463 are generated at step 334—one vertical slot 463 is generated for each bit 341 that represents width in the bit block 340. Pixel blocks 471 are generated as the intersections of the horizontal slots 461 and the vertical slots 463 at step 338 and the pixel blocks are mapped to the bits 341 of the bit block 340 at step 342. Loop 318 ends at step 346, and loop 318 loops for the number of pixel block 471 from the previous iteration level. After loop 318 is complete, method 300 proceeds to step 354 which ends loop 316, and then loops back to step 320.

In this Example, the terminal condition is not found at step 320 so that method 300 proceeds from step 320 to step 350. At step 350 the iteration level is increased by 1, and, upon initial entry into loop 316 the iteration level is set to 1 (first iteration level) at step 350, and then method 300 passes to step 322 and begins loop 318.

At the first iteration level for this Example, the entire digital image 315 is treated as a single pixel block 371, so that loop 318 is executed once at the first iteration level. At step 326 a first iteration bit block 340.17 is generated in memory, which is an unsigned short (16-bit) bit block representation for the bit-block 340 as selected at step 314.

At step 330 at the first iteration level, in order to determine the horizontal slot size of the horizontal slots 461 such as horizontal slots 461.1, 461.2, 461.3, 461.4 expressed as a number of pixels 329 for each of the horizontal slots 461, the height of the digital image 315 is divided by the number of bits 341 in the first iteration bit-block 340.17 that represent height using integer division, and the modulus (if any) is distributed evenly across the horizontal slots 461 beginning from the top of the digital image 315. This ensures that no horizontal slot size will vary by more than one pixel 329 from any other horizontal slot size. The largest horizontal slot sizes with be generally proximate the top of the digital image 315, as illustrated, and the smallest horizontal slot sizes will be generally proximate the bottom of the digital image 315 in this implementation.

In Example II, at the first iteration level, the incoming height of the digital image 315 is 57 pixels 329. The dividend of dividing 57 pixels 329 by 4 (the number of bits 341 representing height in the first iteration bit-block 340.17) using integer division is 14 pixels 329 and the modulus is 1. The modulus is distributed to the horizontal slot size of the topmost horizontal slot 461.1, which now has a horizontal slot size of 15 pixels 329, and, as no more modulus remains to be distributed, the remaining horizontal slots 461.2, 461.3, 461.4 have a horizontal slot size of 14 pixels 329, as illustrated in FIG. 5.

At step 334 at the first iteration level, in order to determine the vertical slot size of the vertical slots 463 such as vertical slots 463.1, 463.2, 463.3, 463.4 expressed as a number of pixels 329 for each of the vertical slots 463, the width is divided by the number of bits in the bit-block 340.17 that represent width using integer division, and the modulus of the division is then distributed evenly across the vertical slots 463 beginning from the left. This ensures that no vertical slot size will vary by more than one pixel 329 from any other vertical slot size. By distributing the modulus in this manner, the largest vertical slot sizes will be generally proximate the left side of the digital image 315 and the smallest vertical slot sizes will be generally proximate the right side of the digital image 315 in this implementation.

In Example II, the width of the digital image 315 is 61 pixels 329. The dividend of dividing 61 pixels 329 by 4 (the number of bits 341 representing width in the first iteration bit-block 340.17) using integer division is 15 and the modulus is 1. The modulus is distributed to the leftmost vertical slot 463.1, which now has a vertical slot size of 16 pixels 329, and, as no more modulus remains to be distributed, the remaining vertical slots 463.2, 463.3, 463.4 have a vertical slot size of 15 pixels 329 at the first iteration level in this Example, as illustrated in FIG. 5.

By dividing the digital image 315 into horizontal slots 461 and the vertical slots 463, the digital image 315 is divided into first iteration level pixel blocks 471 such as first iteration level pixel blocks 471.1-471-16, as illustrated in FIG. 5. Each first iteration level pixel block 471 is mapped to a bit 341 of the first iteration level bit block 340.17 per step 342. Loop 318 ends at step 346, having been executed once at the first iteration level. Method 300 then passes from step 346 to step 354 and then loops back to step 320.

At step 320, the method 300 tests for the terminal condition by generating the leftmost vertical slot and the topmost horizontal slot and then testing the vertical slot size of the leftmost vertical slot 463 and the horizontal slot size of the topmost horizontal slot 461 size to determine if either the leftmost vertical slot size or topmost horizontal slot size is equal to 1 pixel 329. When either the topmost horizontal slot size is 1 pixel 329 or the leftmost vertical slot size is 1 pixel 329, the iterations are terminated (i.e. there are no further iteration levels), and the iteration level becomes the final iteration level. Changed pixels 339 are recorded for their color indexes or grayscale contents, and if changes are found, all the corresponding bits of the bit-blocks 340 in the path of the iteration levels leading to the final iteration level will be set on. A bit-block 340 for the iteration is created only if not at the terminal condition as defined by the rules above, and stored only if at least one of the bit-block bits is turned on by a terminating iteration (more about that later).

In this Example, at step 320 following the end of the first iteration level, the topmost horizontal slot size is 4 pixels 329 and the topmost vertical slot size is 4 pixels 329 so that the terminal condition is not met at step 320. The method therefore advances from step 320 to step 350 where the iteration level is increased by 1 to iteration level 2 (second iteration level).

Figure 6:
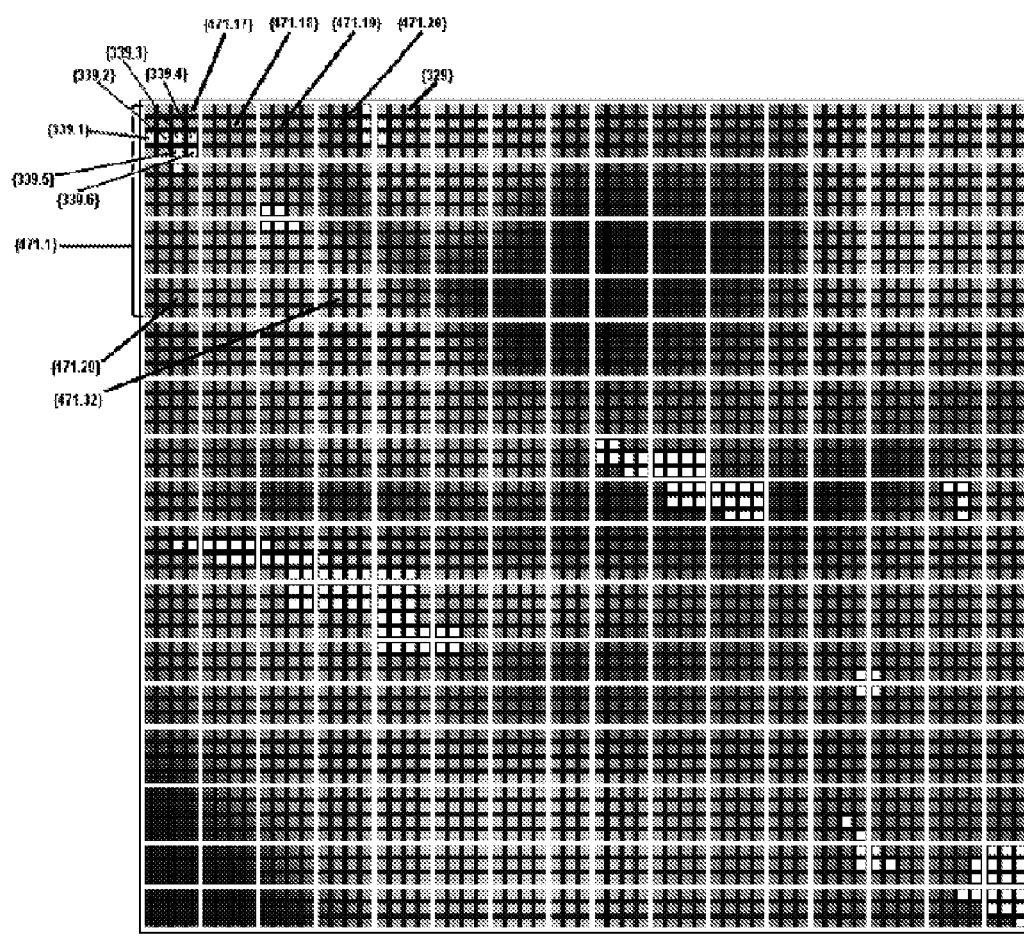
FIG. 6 illustrates the exemplary digital image of FIG. 4 at a second level of processing by the exemplary method of FIGS. 3A and 3B.

At the second iteration level, first iteration level pixel blocks 471, such as pixel block 471.1-471.16 in this Example, are divided into second iteration level pixel blocks such as pixel blocks 471.17-471.32 (FIG. 6). Second iteration level bit blocks, such as bit blocks 340.1-340.16 (see FIG. 7) in this Example, are created that correspond to the second iteration level pixel blocks 471.17-471.32 as method 300 loops through loop 318.

For example, at the second iteration level, the first iteration level pixel block 471, which is 16 pixels wide by 15 pixels high, is divided into horizontal slots and vertical slots at steps 330, 334, 338. The resultant vertical slot sizes are 4 pixels, 4 pixels, 4 pixels, and 4 pixels, and the resultant horizontal slot sizes are 4 pixels, 4 pixels, 4 pixels, and 3 pixels, as illustrated in FIG. 6. FIG. 6 also illustrates the digital image 315 following the second-level iterations on all 16 first iteration level pixel blocks 471.1-471.16, which are mapped to the bit-block 440.17 of the first iteration level. As illustrated in FIG. 6, each of the 16 first iteration level pixel blocks 471.1-471.16 has been divided into second iteration level pixel blocks (only pixel blocks 471.17-471.32) mapped to a corresponding second iteration level bit-block 340.1-340.16.

Note that, in Example II, because neither the width nor the height of the digital image 315 was evenly divisible by four and because of the way that the modulus is distributed, the second iteration level vertical slot sizes 463 tend to decrease from left to right and the second iteration level horizontal slot sizes 461 tend to decrease from top to bottom within a first-iteration pixel block 471 and within the digital image 315 as a whole, but the total variation among all vertical slot sizes never exceeds one pixel, and the total variation among all horizontal slot sizes never exceeds one pixel among the pixel blocks mapped to a particular bit block 340.

At the conclusion of the second iteration level, there are 17 16-bit bit-blocks 340, one first iteration level bit block 340.17 plus 16 second iteration level bit blocks 340.1-340.16. The relationship between bit-blocks 340.1-340.17 and the pixel blocks such as pixel blocks 471.17-471.32 is mapped as in FIG. 7.

Figure 7:
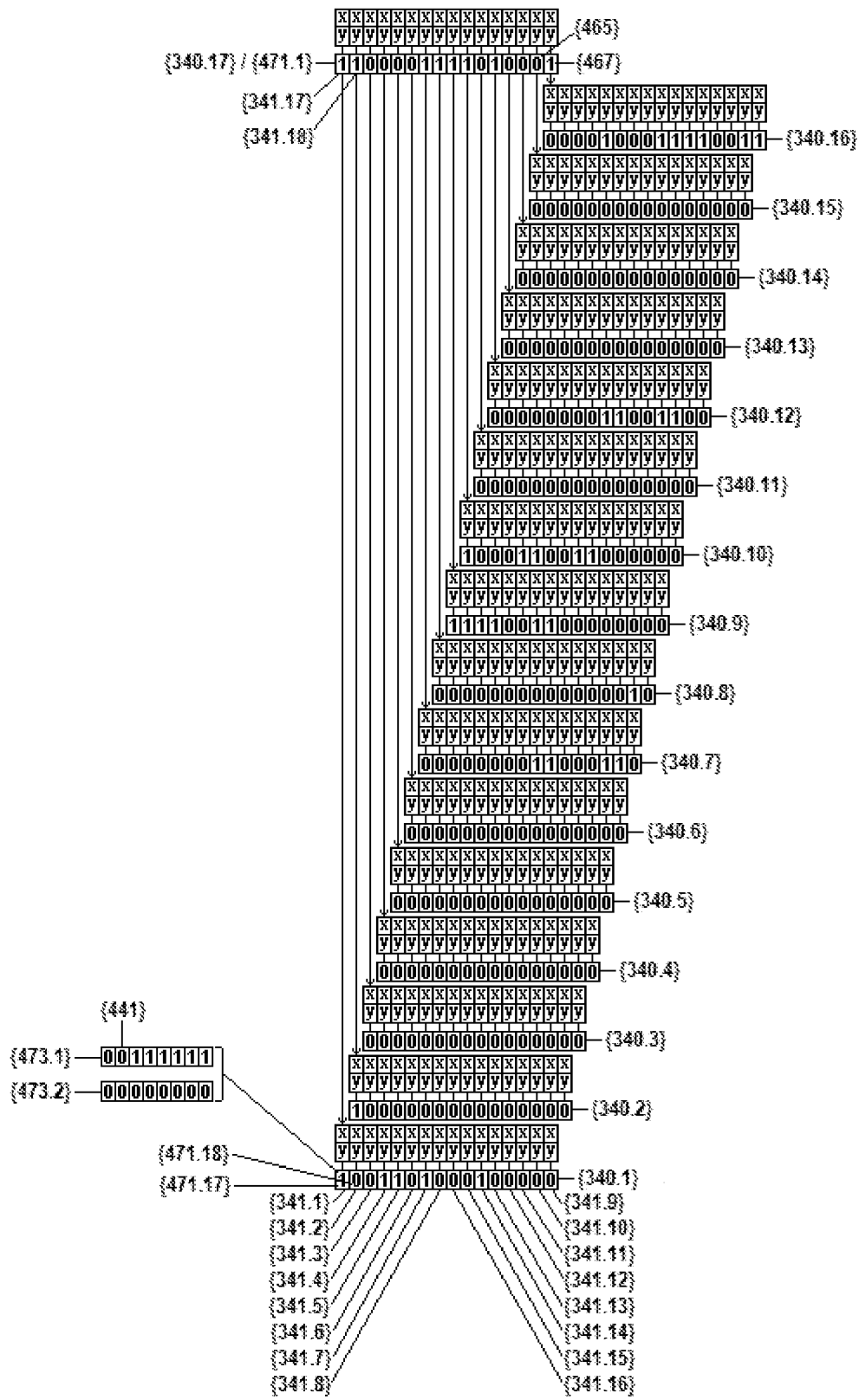
FIG. 7 illustrates by schematic diagram portions of the exemplary method of FIGS. 3A and 3B.

As illustrated in FIG. 7, each bit-block bit 340.1-340.17 is uniquely mapped to the corresponding pixel block 471 with horizontal pixel block size in pixels 329 (represented here by an 'x') and vertical pixel block size in pixels 329 (represented here by a 'y') as illustrated. Each bit 341 of the first iteration level bit-block 340.17 is mapped to a second iteration level bit block 340.1-340.16. As illustrated, in this Example, bit 341.17 of bit block 340.17 is mapped to bit block 340.1, and bit 341.18 of bit block 340.17 is mapped to bit block 340.2. In this Example, bit 341.17 of bit block 340.17 is mapped to pixel block 471.1 and bits 341.1, 341.2 of bit block 340.1 are mapped to pixel blocks 471.17, 471.18, respectively.

Upon completion of the second iteration level in Example II, method 300 loops from step 354 to step 320, and step 320 checks for the termination condition at what is potentially the start of the third iteration level. At the third iteration level, second iteration level pixel blocks such as pixel blocks 471.17-471.32 are subdivided into third iteration level pixel blocks and third iteration level bit blocks are created that correspond to the third iteration level pixel blocks. The third iteration level bit blocks are mapped to the second iteration level bit blocks, which, in turn, are mapped to first iteration level bit block(s). The process of subdividing the pixel blocks continues through successive iteration levels until the terminal condition is met.

In this Example, second level pixel block 471.17 (the topmost leftmost pixel block 471) is 4 pixels 329 wide by 4 pixels 329 high at the conclusion of the second iteration level. Method 300 at step 320 tests for the termination condition prior to beginning the third iteration level by dividing second level pixel block 471.17 into horizontal slots 461 that have horizontal slot sizes of 1 pixel, 1 pixel, 1 pixel, and 1 pixel, respectively. The second level pixel block 471.17 is divided into vertical slots 463 having vertical slot sizes of 1 pixel, 1 pixel, 1 pixel, and 1 pixel, respectively at step 320.

Either the leftmost vertical slot with a vertical slot size of 1 pixel or a topmost horizontal slot with a horizontal slot size of 1 pixel would cause termination of iterations at step 320, and, in Example II, both conditions obtain. In other implementations, the horizontal slot sizes may be, for example, 1 pixel, 1 pixel, 1 pixel, and 0 pixel and the vertical slot sizes are 3 pixel, 3 pixel, 3 pixel, and 2 pixel, which would cause termination base upon the horizontal slot size; or, as a further example, the horizontal slot sizes may be 2 pixel, 2 pixel, 1 pixel, and 1 pixel, and the vertical slot sizes are 1 pixel, 1 pixel, 0 pixel, and 0 pixel, which would cause termination based on the vertical slot size.

Upon detecting the terminating condition at step 320, method 300 branches from step 320 to step 358. At step 358, method 300 loops through loop 387 for each terminal iteration level pixel block 371 to check for changed pixels 339 within the terminal iteration level pixel block 371. The terminal iteration level is equal to the iteration level at the exit from loop 316.

At step 362 in loop 387, if the terminal iteration level pixel block 371 does not include any changed pixels 339, then no changed pixel values are recorded and loop passes from step 362 to step 384, which terminates loop 387, and then back to step 358 until all of the terminal iteration level pixel blocks 371 have been checked for changed pixels 339.

If changed pixels 339 are detected in the specific terminal level pixel block 371, loop 387 branches from step 362 to step 366. Method 300 branches from step 366 in one of two ways depending upon how the terminating bit-fields flag is set.

If the terminating bit-field flag is set to not use terminating bit-fields, method 300 branches from step 366 to step 370. At step 370, pixel values for all of the pixels 329 in the pixel group 371 are recorded. Method 300 then proceeds from step 370 to step 384.

If the terminating bit-field flag is set to use terminating bit-fields, method 300 branches from step 366 to step 374. At step 374, the number of terminal bytes 473 required to provide sufficient terminal bits 441 to map uniquely to all of the pixels 329 in the pixel block 371 is determined and that number of terminal bytes 473 is provided.

At step 378, the terminal bits 441 in the terminal bytes 473 that map to changed pixels 339 are set to the turned-on bit value 467. The terminal bits 441 in the terminal bytes 473 that map to pixels 329 that have not changed from the base image 303 are set to the turned-off bit value 465. In this implementation the turned-on bit value 467 is 1 and the turned-off bit value 465 is 0 (FIG. 7). At step 382, pixel values for the changed pixels 339 are stored, and the method then passes from step 382 to step 384.

After loop 387 is complete, method 300 passes from loop 387 to step 386. At step 386, bits 341 that map to a terminal byte 473 that include a terminal bit 441 set to the turned-on bit value 467 or that map to a bit-block 340 that includes a bit 341 set to the turned-on bit value 467 are set to the turned-on bit value 467. All other bits 341 remain set to the turned-off bit value 465. At step 390, all bit block 340 and terminal bytes 473 that have no bits 341 set to the turned-on bit value 467 (i.e. all bits 341 are set to the turned-off bit value 465) are eliminated thereby producing the compressed image 397. Method 300 passes from step 390 to step 394 and terminates.

In the Example, the second iteration level is the terminal iteration level. Method 300 then passes from step 320 into loop 387. Loop 387 begins with terminal level pixel block 471.17. There are six changed pixels 339.1-339.6 in terminal level pixel block 471.17.

If the terminating bit field flag is set so that terminating bit-fields are not used, method 300 passes from step 366 to step 370. All pixels 329 in terminal level pixel block 471.17 are recorded at step 370 so that a total of 16 pixels values for the 16 pixels 329 in terminal level pixel block 471.17 are recorded and are associated with the bit 341,1 in the bit-block that maps to pixel block 471.17.

If the terminating bit field flag is set so that terminating bit-fields are used, then 2 terminal bytes 473 are generated at step 374. The bits 341 in the terminal bytes 473 that map to the 6 changed pixels 339.1-339.6 are set to the turned-on bit value 467 at step 378, and the pixel values of the 6 changed pixels 339.1-339.6 are stored at step 382 (in a linear one-dimensional array, appended as they are recorded).

Loop 387 loops for each terminal iteration level pixel block 371 to check for changed pixels 339 within the terminal iteration level pixel block 371. Method 300 then passes out of loop 387 to step 386. At step 386, bits 341 that map to either a terminal byte 473 with at least one terminal bit 473 set to the turned-on bit value 467 or that map to a bit-block 340 with at least one bit 341 set to the turned-on bit value 467 are set to the turned-on bit value 467. FIG. 7 illustrates the bit-blocks 340.1-340.17 following step 386. The mapping between bit blocks 340 and pixel blocks 471 is indicated by the lines in the Figure with the (x,y) grouping indicating the horizontal pixel block size vertical pixel block size of the pixel block 471.

Figure 8:
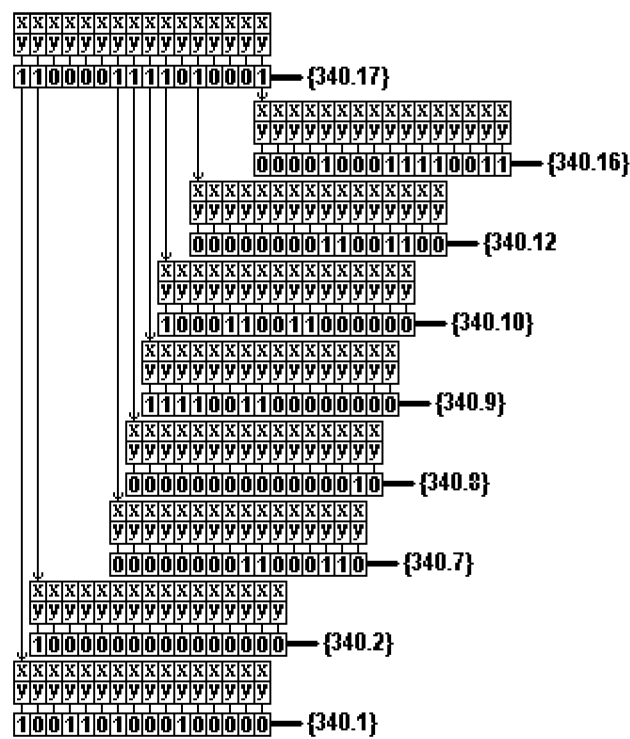
FIG. 8 illustrates by schematic diagram portions of the exemplary method of FIGS. 3A and 3B.

At step 390, all bit block 340 and terminal bytes 473 that have no bits 341 or terminal bits 473, respectively, set to the turned-on bit value 467 (i.e. have only bits 341 or terminal pits 473 set to the turned-off bit value 465) are eliminated thereby producing the compressed image 397. The resulting bit-blocks 340 for this Example are illustrated in FIG. 8. The terminal bytes 473 are not included in the illustration of FIG. 8. As a side note, the horizontal slot sizes and vertical slot sizes (x,y), although critical for re-constructing the digital image 315, are not stored in the compressed image 397. For any given starting rectangle size (which will be part of the compressed image 397 and will be used in the reconstructing the digital image 315, adding two unsigned shorts, or four bytes) and a given nominal slot size and orientation (adding one byte), the horizontal and vertical slot sizes (x,y) may be re-created identically whenever the technique described here is applied. Since the slot sizes (x,y) can be re-created at will, there is no need to store the slot sizes (x,y). In Example II, method 300 passes from step 390 to step 394 and terminates.

The pixel blocks are numbered in order of processing from 001 to 0256 in FIG. 9 with changed pixels indicated in white. The order of processing in and of itself does not affect the method, although one order may process faster in a certain programming language or on a certain processor better than another and of course the reconstruction order must match the compression order. Data from the compression for Example II is tabulated in Table I.

TABLE I

| Pixel Block | 2nd iteration level bit-block bit position | 1st iteration level bit-block position | Width (pixels) | Height (pixels) | Changed Pixels? | Pixel values saved (no terminal bit fields option) | Pixel values saved (terminal bit fields option) | Terminal bytes/bits |
|---|---|---|---|---|---|---|---|---|
| 0001 | 1 | 1 | 4 | 4 | Yes | 16 | 6 | 2/16 |
| 0002 | 2 | 1 | 4 | 4 | No | | | |
| 0003 | 3 | 1 | 4 | 4 | No | | | |
| 0004 | 4 | 1 | 4 | 4 | Yes | 16 | 3 | 2/16 |
| 0005 | 5 | 1 | 4 | 4 | Yes | 16 | 1 | 2/16 |
| 0006 | 6 | 1 | 4 | 4 | No | | | |
| 0007 | 7 | 1 | 4 | 4 | Yes | 16 | 2 | 2/16 |
| 0008 | 8 | 1 | 4 | 4 | No | | | |
| 0009 | 9 | 1 | 4 | 4 | No | | | |
| 0010 | 10 | 1 | 4 | 4 | No | | | |
| 0011 | 11 | 1 | 4 | 4 | Yes | 16 | 3 | 2/16 |
| 0012 | 12 | 1 | 4 | 4 | No | | | |
| 0013 | 13 | 1 | 4 | 3 | No | | | |
| 0014 | 14 | 1 | 4 | 3 | No | | | |
| 0015 | 15 | 1 | 4 | 3 | No | | | |
| 0016 | 16 | 1 | 4 | 3 | No | | | |
| 0017 | 1 | 2 | 4 | 4 | Yes | 16 | 2 | 2/16 |
| 0018 | 2 | 2 | 4 | 4 | No | | | |
| 0019 | 3 | 2 | 4 | 4 | No | | | |
| 0020 | 4 | 2 | 3 | 4 | No | | | |
| 0021 | 5 | 2 | 4 | 4 | No | | | |
| 0022 | 6 | 2 | 4 | 4 | No | | | |
| 0023 | 7 | 2 | 4 | 4 | No | | | |
| 0024 | 8 | 2 | 3 | 4 | No | | | |
| 0025 | 9 | 2 | 4 | 4 | No | | | |
| 0026 | 10 | 2 | 4 | 4 | No | | | |
| 0027 | 11 | 2 | 4 | 4 | No | | | |
| 0028 | 12 | 2 | 3 | 4 | No | | | |
| 0029 | 13 | 2 | 4 | 3 | No | | | |
| 0030 | 14 | 2 | 4 | 3 | No | | | |
| 0031 | 15 | 2 | 4 | 3 | No | | | |
| 0032 | 16 | 2 | 3 | 3 | No | | | |
| 0033 | 1 | 3 | 4 | 4 | No | | | |
| 0034 | 2 | 3 | 4 | 4 | No | | | |
| 0035 | 3 | 3 | 4 | 4 | No | | | |
| 0036 | 4 | 3 | 3 | 4 | No | | | |
| 0037 | 5 | 3 | 4 | 4 | No | | | |
| 0038 | 6 | 3 | 4 | 4 | No | | | |
| 0039 | 7 | 3 | 4 | 4 | No | | | |
| 0040 | 8 | 3 | 3 | 4 | No | | | |
| 0041 | 9 | 3 | 4 | 4 | No | | | |
| 0042 | 10 | 3 | 4 | 4 | No | | | |
| 0043 | 11 | 3 | 4 | 4 | No | | | |
| 0044 | 12 | 3 | 3 | 4 | No | | | |
| 0045 | 13 | 3 | 4 | 3 | No | | | |
| 0046 | 14 | 3 | 4 | 3 | No | | | |
| 0047 | 15 | 3 | 4 | 3 | No | | | |
| 0048 | 16 | 3 | 3 | 3 | No | | | |
| 0049 | 1 | 4 | 4 | 4 | No | | | |
| 0050 | 2 | 4 | 4 | 4 | No | | | |
| 0051 | 3 | 4 | 4 | 4 | No | | | |
| 0052 | 4 | 4 | 3 | 4 | No | | | |
| 0053 | 5 | 4 | 4 | 4 | No | | | |
| 0054 | 6 | 4 | 4 | 4 | No | | | |
| 0055 | 7 | 4 | 4 | 4 | No | | | |
| 0056 | 8 | 4 | 3 | 4 | No | | | |
| 0057 | 9 | 4 | 4 | 4 | No | | | |
| 0058 | 10 | 4 | 4 | 4 | No | | | |
| 0059 | 11 | 4 | 4 | 4 | No | | | |
| 0060 | 12 | 4 | 3 | 4 | No | | | |
| 0061 | 13 | 4 | 4 | 3 | No | | | |
| 0062 | 14 | 4 | 4 | 3 | No | | | |
| 0063 | 15 | 4 | 4 | 3 | No | | | |

TABLE I-continued

| Pixel Block | 2nd iteration level bit-block bit position | 1st iteration level bit-block position | Width (pixels) | Height (pixels) | Changed Pixels? | Pixel values saved (no terminal bit fields option) | Pixel values saved (terminal bit fields option) | Terminal bytes/bits |
|---|---|---|---|---|---|---|---|---|
| 0064 | 16 | 4 | 3 | 3 | No | | | |
| 0065 | 1 | 5 | 4 | 4 | No | | | |
| 0066 | 2 | 5 | 4 | 4 | No | | | |
| 0067 | 3 | 5 | 4 | 4 | No | | | |
| 0068 | 4 | 5 | 4 | 4 | No | | | |
| 0069 | 5 | 5 | 4 | 4 | No | | | |
| 0070 | 6 | 5 | 4 | 4 | No | | | |
| 0071 | 7 | 5 | 4 | 4 | No | | | |
| 0072 | 8 | 5 | 4 | 4 | No | | | |
| 0073 | 9 | 5 | 4 | 3 | No | | | |
| 0074 | 10 | 5 | 4 | 3 | No | | | |
| 0075 | 11 | 5 | 4 | 3 | No | | | |
| 0076 | 12 | 5 | 4 | 3 | No | | | |
| 0077 | 13 | 5 | 4 | 3 | No | | | |
| 0078 | 14 | 5 | 4 | 3 | No | | | |
| 0079 | 15 | 5 | 4 | 3 | No | | | |
| 0080 | 16 | 5 | 4 | 3 | No | | | |
| 0081 | 1 | 6 | 4 | 4 | No | | | |
| 0082 | 2 | 6 | 4 | 4 | No | | | |
| 0083 | 3 | 6 | 4 | 4 | No | | | |
| 0084 | 4 | 6 | 3 | 4 | No | | | |
| 0085 | 5 | 6 | 4 | 4 | No | | | |
| 0086 | 6 | 6 | 4 | 4 | No | | | |
| 0087 | 7 | 6 | 4 | 4 | No | | | |
| 0088 | 8 | 6 | 3 | 4 | No | | | |
| 0089 | 9 | 6 | 4 | 3 | No | | | |
| 0090 | 10 | 6 | 4 | 3 | No | | | |
| 0091 | 11 | 6 | 4 | 3 | No | | | |
| 0092 | 12 | 6 | 3 | 3 | No | | | |
| 0093 | 13 | 6 | 4 | 3 | No | | | |
| 0094 | 14 | 6 | 4 | 3 | No | | | |
| 0095 | 15 | 6 | 4 | 3 | No | | | |
| 0096 | 16 | 6 | 3 | 3 | No | | | |
| 0097 | 1 | 7 | 4 | 4 | No | | | |
| 0098 | 2 | 7 | 4 | 4 | No | | | |
| 0099 | 3 | 7 | 4 | 4 | No | | | |
| 0100 | 4 | 7 | 3 | 4 | No | | | |
| 0101 | 5 | 7 | 4 | 4 | No | | | |
| 0102 | 6 | 7 | 4 | 4 | No | | | |
| 1003 | 7 | 7 | 4 | 4 | No | | | |
| 0104 | 8 | 7 | 3 | 4 | No | | | |
| 0105 | 9 | 7 | 4 | 3 | Yes | 12 | 8 | 2/12 |
| 0106 | 10 | 7 | 4 | 3 | Yes | 12 | 8 | 2/12 |
| 0107 | 11 | 7 | 4 | 3 | No | | | |
| 0108 | 12 | 7 | 3 | 3 | No | | | |
| 0109 | 13 | 7 | 4 | 3 | No | | | |
| 0110 | 14 | 7 | 4 | 3 | Yes | 12 | 6 | 2/12 |
| 0111 | 15 | 7 | 4 | 3 | Yes | 12 | 11 | 2/12 |
| 0112 | 16 | 7 | 3 | 3 | No | | | |
| 0113 | 1 | 8 | 4 | 4 | No | | | |
| 0114 | 2 | 8 | 4 | 4 | No | | | |
| 0115 | 3 | 8 | 4 | 4 | No | | | |
| 0116 | 4 | 8 | 3 | 4 | No | | | |
| 0117 | 5 | 8 | 4 | 4 | No | | | |
| 0118 | 6 | 8 | 4 | 4 | No | | | |
| 0119 | 7 | 8 | 4 | 4 | No | | | |
| 0120 | 8 | 8 | 3 | 4 | No | | | |
| 0121 | 9 | 8 | 4 | 3 | No | | | |
| 0122 | 10 | 8 | 4 | 3 | No | | | |
| 0123 | 11 | 8 | 4 | 3 | No | | | |
| 0124 | 12 | 8 | 3 | 3 | No | | | |
| 0125 | 13 | 8 | 4 | 3 | No | | | |
| 0126 | 14 | 8 | 4 | 3 | No | | | |
| 0127 | 15 | 8 | 4 | 3 | Yes | 12 | 4 | 2/12 |
| 0128 | 16 | 8 | 3 | 3 | No | | | |
| 0129 | 1 | 9 | 4 | 4 | Yes | 16 | 2 | 2/16 |
| 0130 | 2 | 9 | 4 | 4 | Yes | 16 | 7 | 2/16 |
| 0131 | 3 | 9 | 4 | 4 | Yes | 16 | 7 | 2/16 |
| 0132 | 4 | 9 | 4 | 4 | Yes | 16 | 5 | 2/16 |
| 0133 | 5 | 9 | 4 | 4 | No | | | |
| 0134 | 6 | 9 | 4 | 4 | No | | | |

TABLE I-continued

| Pixel Block | 2nd iteration level bit-block bit position | 1st iteration level bit-block position | Width (pixels) | Height (pixels) | Changed Pixels? | Pixel values saved (no terminal bit fields option) | Pixel values saved (terminal bit fields option) | Terminal bytes/bits |
|---|---|---|---|---|---|---|---|---|
| 0135 | 7 | 9 | 4 | 4 | Yes | 16 | 4 | 2/16 |
| 0136 | 8 | 9 | 4 | 4 | Yes | 16 | 8 | 2/16 |
| 0137 | 9 | 9 | 4 | 3 | No | | | |
| 0138 | 10 | 9 | 4 | 3 | No | | | |
| 0139 | 11 | 9 | 4 | 3 | No | | | |
| 0140 | 12 | 9 | 4 | 3 | No | | | |
| 0141 | 13 | 9 | 4 | 3 | No | | | |
| 0142 | 14 | 9 | 4 | 3 | No | | | |
| 0143 | 15 | 9 | 4 | 3 | No | | | |
| 0144 | 16 | 9 | 4 | 3 | No | | | |
| 0145 | 1 | 10 | 4 | 4 | Yes | 16 | 3 | 2/16 |
| 0146 | 2 | 10 | 4 | 4 | No | | | |
| 0147 | 3 | 10 | 4 | 4 | No | | | |
| 0148 | 4 | 10 | 3 | 4 | No | | | |
| 0149 | 5 | 10 | 4 | 4 | Yes | 16 | 13 | 2/16 |
| 0150 | 6 | 10 | 4 | 4 | Yes | 16 | 2 | 2/16 |
| 0151 | 7 | 10 | 4 | 4 | No | | | |
| 0152 | 8 | 10 | 3 | 4 | No | | | |
| 0153 | 9 | 10 | 4 | 3 | Yes | 12 | 4 | 2/12 |
| 0154 | 10 | 10 | 4 | 3 | Yes | 12 | 2 | 2/12 |
| 0155 | 11 | 10 | 4 | 3 | No | | | |
| 0156 | 12 | 10 | 3 | 3 | No | | | |
| 0157 | 13 | 10 | 4 | 3 | No | | | |
| 0158 | 14 | 10 | 4 | 3 | No | | | |
| 0159 | 15 | 10 | 4 | 3 | No | | | |
| 0160 | 16 | 10 | 3 | 3 | No | | | |
| 0161 | 1 | 11 | 4 | 4 | No | | | |
| 0162 | 2 | 11 | 4 | 4 | No | | | |
| 0163 | 3 | 11 | 4 | 4 | No | | | |
| 0164 | 4 | 11 | 3 | 4 | No | | | |
| 0165 | 5 | 11 | 4 | 4 | No | | | |
| 0166 | 6 | 11 | 4 | 4 | No | | | |
| 0167 | 7 | 11 | 4 | 4 | No | | | |
| 0168 | 8 | 11 | 3 | 4 | No | | | |
| 0169 | 9 | 11 | 4 | 3 | No | | | |
| 0170 | 10 | 11 | 4 | 3 | No | | | |
| 0171 | 11 | 11 | 4 | 3 | No | | | |
| 0172 | 12 | 11 | 3 | 3 | No | | | |
| 0173 | 13 | 11 | 4 | 3 | No | | | |
| 0174 | 14 | 11 | 4 | 3 | No | | | |
| 0175 | 15 | 11 | 4 | 3 | No | | | |
| 0176 | 16 | 11 | 3 | 3 | No | | | |
| 0177 | 1 | 12 | 4 | 4 | No | | | |
| 0178 | 2 | 12 | 4 | 4 | No | | | |
| 0179 | 3 | 12 | 4 | 4 | No | | | |
| 0180 | 4 | 12 | 3 | 4 | No | | | |
| 0181 | 5 | 12 | 4 | 4 | No | | | |
| 0182 | 6 | 12 | 4 | 4 | No | | | |
| 0183 | 7 | 12 | 4 | 4 | No | | | |
| 0184 | 8 | 12 | 3 | 4 | No | | | |
| 0185 | 9 | 12 | 4 | 3 | Yes | 12 | 1 | 12 |
| 0186 | 10 | 12 | 4 | 3 | Yes | 12 | 1 | 12 |
| 0187 | 11 | 12 | 4 | 3 | No | | | |
| 0188 | 12 | 12 | 3 | 3 | No | | | |
| 0189 | 13 | 12 | 4 | 3 | Yes | 12 | 1 | 12 |
| 0190 | 14 | 12 | 4 | 3 | Yes | 12 | 1 | 12 |
| 0191 | 15 | 12 | 4 | 3 | No | | | |
| 0192 | 16 | 12 | 3 | 3 | No | | | |
| 0193 | 1 | 13 | 4 | 4 | No | | | |
| 0194 | 2 | 13 | 4 | 4 | No | | | |
| 0195 | 3 | 13 | 4 | 4 | No | | | |
| 0196 | 4 | 13 | 4 | 4 | No | | | |
| 0197 | 5 | 13 | 4 | 4 | No | | | |
| 0198 | 6 | 13 | 4 | 4 | No | | | |
| 0199 | 7 | 13 | 4 | 4 | No | | | |
| 0200 | 8 | 13 | 4 | 4 | No | | | |
| 0201 | 9 | 13 | 4 | 3 | No | | | |
| 0202 | 10 | 13 | 4 | 3 | No | | | |
| 0203 | 11 | 13 | 4 | 3 | No | | | |
| 0204 | 12 | 13 | 4 | 3 | No | | | |
| 0205 | 13 | 13 | 4 | 3 | No | | | |

TABLE I-continued

| Pixel Block | 2nd iteration level bit-block bit position | 1st iteration level bit-block position | Width (pixels) | Height (pixels) | Changed Pixels? | Pixel values saved (no terminal bit fields option) | Pixel values saved (terminal bit fields option) | Terminal bytes/bits |
|---|---|---|---|---|---|---|---|---|
| 0206 | 14 | 13 | 4 | 3 | No | | | |
| 0207 | 15 | 13 | 4 | 3 | No | | | |
| 0208 | 16 | 13 | 4 | 3 | No | | | |
| 0209 | 1 | 14 | 4 | 4 | No | | | |
| 0210 | 2 | 14 | 4 | 4 | No | | | |
| 0211 | 3 | 14 | 4 | 4 | No | | | |
| 0212 | 4 | 14 | 3 | 4 | No | | | |
| 0213 | 5 | 14 | 4 | 4 | No | | | |
| 0214 | 6 | 14 | 4 | 4 | No | | | |
| 0215 | 7 | 14 | 4 | 4 | No | | | |
| 0216 | 8 | 14 | 3 | 4 | No | | | |
| 0217 | 9 | 14 | 4 | 3 | No | | | |
| 0218 | 10 | 14 | 4 | 3 | No | | | |
| 0219 | 11 | 14 | 4 | 3 | No | | | |
| 0220 | 12 | 14 | 3 | 3 | No | | | |
| 0221 | 13 | 14 | 4 | 3 | No | | | |
| 0222 | 14 | 14 | 4 | 3 | No | | | |
| 0223 | 15 | 14 | 4 | 3 | No | | | |
| 0224 | 16 | 14 | 3 | 3 | No | | | |
| 0225 | 1 | 15 | 4 | 4 | No | | | |
| 0226 | 2 | 15 | 4 | 4 | No | | | |
| 0227 | 3 | 15 | 4 | 4 | No | | | |
| 0228 | 4 | 15 | 3 | 4 | No | | | |
| 0229 | 5 | 15 | 4 | 4 | No | | | |
| 0230 | 6 | 15 | 4 | 4 | No | | | |
| 0231 | 7 | 15 | 4 | 4 | No | | | |
| 0232 | 8 | 15 | 3 | 4 | No | | | |
| 0233 | 9 | 15 | 4 | 3 | No | | | |
| 0234 | 10 | 15 | 4 | 3 | No | | | |
| 0235 | 11 | 15 | 4 | 3 | No | | | |
| 0236 | 12 | 15 | 3 | 3 | No | | | |
| 0237 | 13 | 15 | 4 | 3 | No | | | |
| 0238 | 14 | 15 | 4 | 3 | No | | | |
| 0239 | 15 | 15 | 4 | 3 | No | | | |
| 0240 | 16 | 15 | 3 | 3 | No | | | |
| 0241 | 1 | 16 | 4 | 4 | No | | | |
| 0242 | 2 | 16 | 4 | 4 | No | | | |
| 0243 | 3 | 16 | 4 | 4 | No | | | |
| 0244 | 4 | 16 | 3 | 4 | No | | | |
| 0245 | 5 | 16 | 4 | 4 | Yes | 16 | 2 | 2/16 |
| 0246 | 6 | 16 | 4 | 4 | No | | | |
| 0247 | 7 | 16 | 4 | 4 | No | | | |
| 0248 | 8 | 16 | 3 | 4 | No | | | |
| 0249 | 9 | 16 | 4 | 3 | Yes | 12 | 2 | 2/12 |
| 0250 | 10 | 16 | 4 | 3 | Yes | 12 | 3 | 2/12 |
| 0251 | 11 | 16 | 4 | 3 | Yes | 12 | 2 | 2/12 |
| 0252 | 12 | 16 | 3 | 3 | Yes | 9 | 9 | 2/9 |
| 0253 | 13 | 16 | 4 | 3 | No | | | |
| 0254 | 14 | 16 | 4 | 3 | No | | | |
| 0255 | 15 | 16 | 4 | 3 | Yes | 12 | 2 | 2/12 |
| 0256 | 16 | 16 | 3 | 3 | Yes | 9 | 7 | 2/9 |

Using data from Table I, the size of the compressed image 397 in Example II is as follows. Four bytes (two unsigned shorts) are required to specify the height and width of digital image 315, and another four bytes are required to store the horizontal and vertical offsets of the digital image 315 within the larger image 305. An additional byte is needed to specify the bit-block size, asymmetrical orientation, and terminal bit-field flag, and another byte to indicate the original image color type. 18 bytes more (9 unsigned shorts) are needed for the bit-blocks 340.

For the case where terminating bit field flag is set so that terminating bit fields are not used, a total of 454 pixel values are saved, which requires 454 bytes for the single byte gray-scale pixel values, or, for a color image, the one-byte color indices. Addition of the quantized colors brings the total to 773 bytes. Thus, the total number of bytes needed for the compressed image 397 is 773 bytes, as opposed to the 10,431 bytes required for the uncompressed original color image—that is a 13.5 to 1 compression ratio.

For the case where terminating bit field flag is set so that terminating bit fields are used, 142 pixel values are saved which requires 142 bytes for the gray-scale pixel values, or for color images, the one-byte color indices. For a color image, there are 88 unique colors among the saved pixel values, so the compressed image 397 would include 88×3=264, bytes. An additional 66 bytes are required for terminal bytes.

If a shared-bit-field option for terminating bit-fields instead of the per-bit-block terminating bit-fields is used, there are 16 bit-fields requiring 16 bits each, 15 bit-fields requiring 12 bits each, and 3 bit-fields requiring 9 bits each for a total of 454 bits, requiring 57 8-bit bytes for storage. Addition of the quantized colors brings the total to 500 bytes. In this case, the shared-bit-field solution for terminating bit-fields would have saved 9 bytes over per-bit-block terminating bit-fields.

Thus, the total number of bytes needed for the compressed image 397 is 500 bytes, as opposed to the 10,431 bytes required for the uncompressed original color image—that is a 20.9 to 1 compression ratio.

Note that base image 303, larger image 305, digital image 315, and compressed image 397 are suitable candidates for additional lossless compression, such as by the Zip compression tool.

Figure 10:
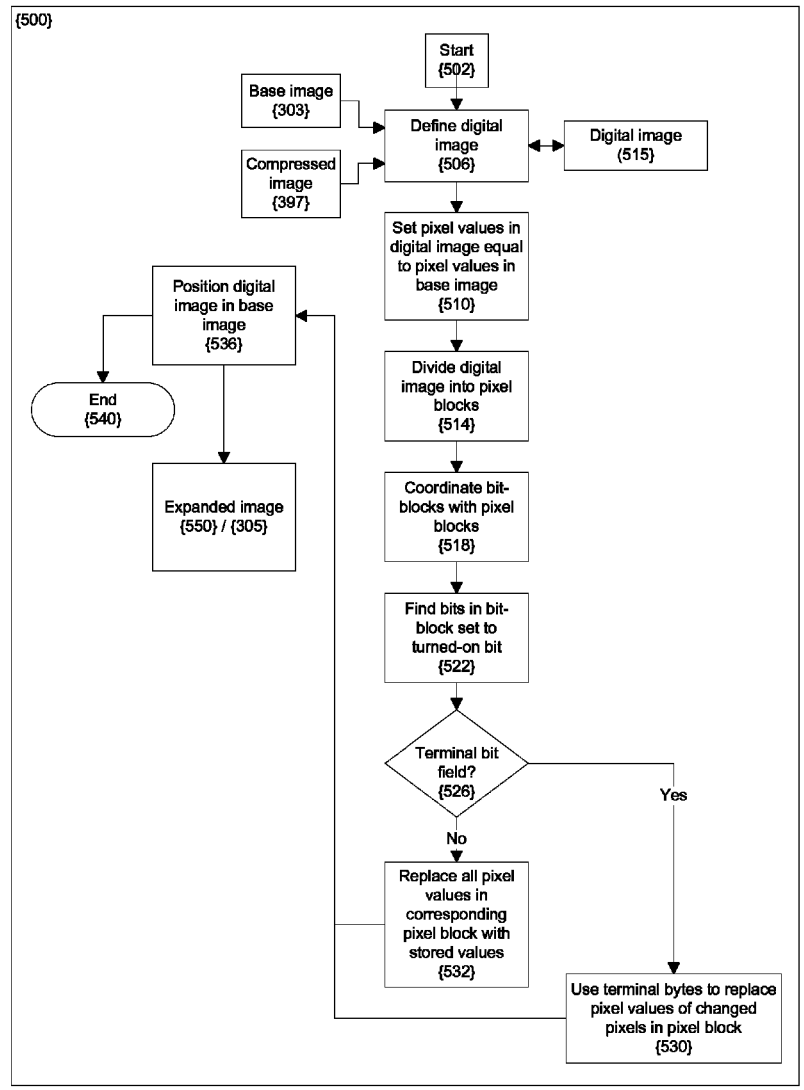
FIG. 10 illustrates by flow chart an exemplary method for expanding a compressed image.

Method 500, as illustrated by flow chart in FIG. 10, expands the compressed image such as compressed image 397 into an expanded image 550. In this illustrative implementation, the expanded image 550 may be substantially the same as larger image 305 from which compressed image 397 was created so that the compression/expansion may be essentially lossless.

As illustrated in FIG. 10, method 500 begins at step 502 and then proceeds to step 506. At step 506, digital image 515 is formed using the compressed image 397 and the base image 303. Height and width and asymmetrical orientation of digital image 315 were stored in compressed image 397 and are used to form digital image 515. At step 510, the pixel values of the pixels 329 in digital image 515 are set to the pixel values of the corresponding pixels 329 in the base image 303.

The digital image 515 is divided into pixel blocks 371 at step 514 in the same way as in the compressed image 397 using method 300.

At step 518, the bit-blocks 340 stored in the compressed image 397 are coordinated with the pixel blocks 371.

At step 522 bits 341 in the bit block 340 that are set to the turned-on bit value 467 are found. For each bit 341 equal to the turned-on bit value 467, method 500 branches from step 522 to either step 530 or step 532 depending upon whether or not the terminal bit field is used, respectively.

Method 500 branches from step 520 to step 530 if the terminal bit field is used. At step 530, the terminal bytes 473 are used to indicate the changed pixels 339, and the pixel values of the changed pixels 339 are replaced as indicated by terminal bits 441 in the terminal bytes 473 having the turned-on bit value 467. Pixel values from the compressed image 397 are applied in reverse order of the order in which the pixel values were stored.

Method 500 branches from step 520 to step 532 if the terminal bit field is not used. At step 532 all of the pixels 329 in the pixel block 371 are replaced with stored pixel values from the compressed image 597.

After all of the pixel blocks 371 corresponding to bits 341 in the bit blocks 340 having the turned-on bit value 467 and/or corresponding to terminal bits 441 in the terminal bytes 473 having the turned-on bit value 467 have been modified, method 500 proceeds to step 536. At step 536, the digital image 515 is positioned in the base image 303 using the vertical and/or horizontal offsets stored in the compressed image 397. The result at step 536 is the expanded image 550 that substantially corresponds to the larger image 305.

Figure 11A:
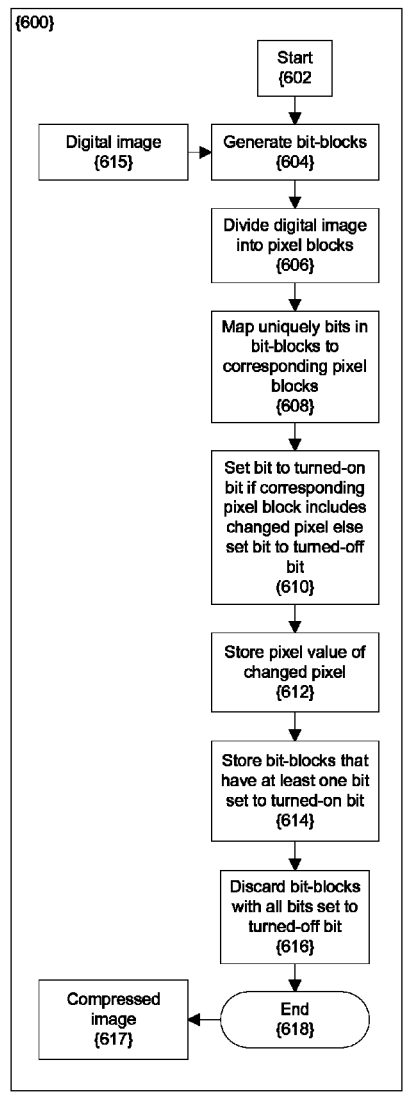
FIG. 11A illustrates by flow chart an exemplary method for compressing a digital image.

FIG. 11A, illustrates method 600 of compressing digital image 615. As illustrated in FIG. 11A, method 600 initiates at step 602. At step 604, bit blocks such as bit block 340.17 are generated. Digital image 615, which is input into method 600, is divided into pixel blocks such as pixel blocks 471.1-471.16 at step 606. The pixel blocks are mapped uniquely to bits in the bit block(s)) at step 608. At step 610, the bits in the bit blocks are set to the turned-on bit value 467 if the corresponding pixel blocks to which the bits map includes a changed pixel. The turned-on bit value 467 is indicative of a changed pixel. Otherwise, if the corresponding pixel block contains no changed pixel, the bit is set to the turned-off bit value 465. The turned-off bit value is indicative of no changed pixel.

The pixel value(s) of the changed pixel(s) are stored at step 612. The pixel value(s) of the changed pixels are associated with the bit that maps to the pixel block that includes the changed pixels.

At step 614, bit block(s) that include at least one bit set to the turned-on bit value are stored. At step 616, bit blocks with all bits set to the turned-off bit value are discarded. Method 600 terminates at step 618. Compressed image 617 that results from method 600 includes in various implementations, the pixel values of changed pixels within the digital image and bit blocks wherein each bit block includes at least one bit set to the value indicative of the changed pixel within the corresponding pixel block, the output file. The compressed image 617 may include a base image such as base image 303 in various implementations. The compressed image 617, in various implementations, includes the pixel values of changed pixels within the digital image. The compressed image 617 in various implementations includes bit-blocks, each bit block including at least one bit set to the value indicative of the changed pixel within the corresponding pixel block. The compressed image may include offsets, orientation, and other information that may allow the compressed image to be positioned within the base image and/or that allow for regeneration of the pixel blocks and the locating of the pixel blocks within the base image.

Figure 11B:
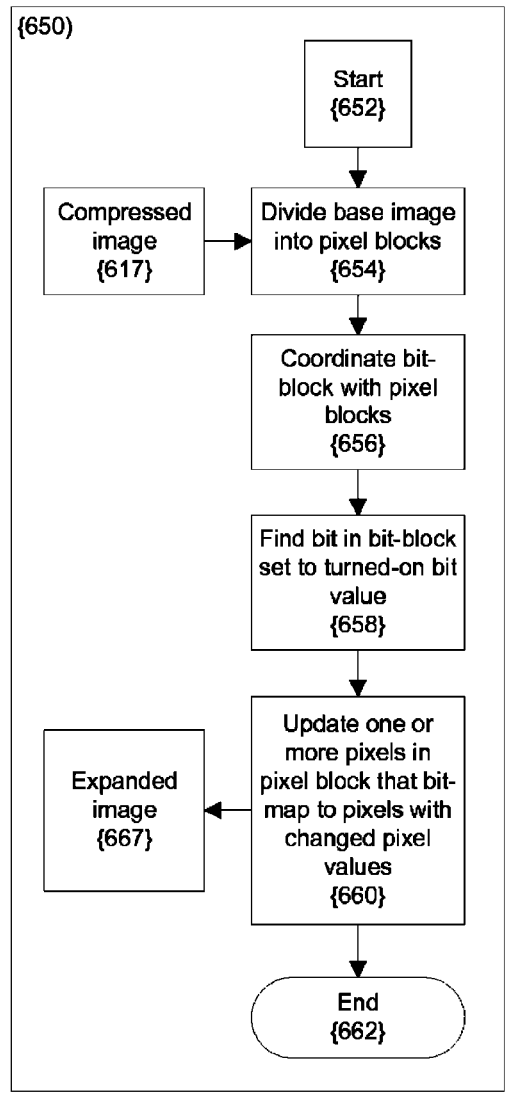
FIG. 11B illustrates by flow chart an exemplary method for expanding a compressed image.

FIG. 11B illustrates method 650 of expanding the compressed image 617 produced by method 600. Method 650 begins at step 652, and, as illustrated in FIG. 11B, the compressed image 617 is input into method 650. The base image, such as base image 303, which may be included in the compressed image 618 in various implementations, is divided into pixel blocks at step 654. At step 656, the pixel blocks are coordinated with the bit blocks in the compressed image 617 so that bits in the bit blocks are coordinated with the corresponding pixel blocks to which the bits are mapped.

At step 658, bits in the bit blocks that are set to the turned-on bit value are found. At step 660, the changed pixels in the pixel blocks that bits set to the turned-on bit value map to are updated with the pixel values stored in the compressed image 617. Method 650 terminates at step 662, and expanded image 667 results.

The foregoing discussion along with the Figures discloses and describes various exemplary implementations. These implementations are not meant to limit the scope of coverage, but, instead, to assist in understanding the context of the language used in this specification and in the claims. Accordingly, variations of the methods as well as systems and compositions of matter that differ from these exemplary implementations may be encompassed by the appended claims. Upon study of this disclosure and the exemplary implementations herein, one of ordinary skill in the art may readily recognize that various changes, modifications and variations can be made thereto without departing from the spirit and scope of the inventions as defined in the following claims.

What is claimed is:

1. A computer-implemented method, comprising the steps of:
   generating bit blocks, each bit block comprising one or more bits;
   dividing a digital image into pixel-blocks, each pixel block including one or more pixels ;
   mapping uniquely the bits to corresponding pixel blocks;

setting the bits to a value indicative of a changed pixel within the corresponding pixel block or to a value indicative of no changed pixel within the corresponding pixel block;

storing the pixel value of the changed pixel;

storing bit-blocks including at least one bit set to the value indicative of the changed pixel within the corresponding pixel block;

discarding bit-blocks having all bits included therein set to the value indicative of the absence of a changed pixel within the corresponding pixel block; and wherein the generating, dividing, mapping, setting, storing, storing, and discarding steps of said method are performed using a digital computer.

2. The method, as in claim 1, further comprising the step of:
storing pixel values of all pixels included in the pixel block, the pixel block having at least one changed pixel.

3. The method, as in claim 1, further comprising the steps of:
generating a terminal byte, the terminal byte comprising one or more terminal bits;
mapping each terminal bit of the terminal byte uniquely to a corresponding pixel within the pixel block, the pixel block including a changed pixel;
setting each terminal bit of the terminal byte to a value indicative that the corresponding pixel is a changed pixel or to a value indicative that the corresponding pixel is not a changed pixel;
storing the terminal byte; and
storing the pixel value of the changed pixel.

4. The method, as in claim 1, further comprising the step of:
storing a base image.

5. The method, as in claim 1, wherein the digital image comprises a portion of a larger image, the digital image includes all of the changed pixels within the larger image.

6. The method, as in claim 1, further comprising the step of:
finding a changed pixel, a changed pixel is a pixel having a pixel value differing from the base pixel value of the pixel in a base image.

7. The method, as in claim 6, wherein the base image is separate from the digital image in time.

8. The method, as in claim 6, wherein the base image is separate from the digital image in space.

9. The method, as in claim 1, wherein the digital image comprises the image projected on at least a portion of a computer screen by a computer.

10. The method, as in claim 1, wherein the digital image comprises 256-grayscale pixels.

11. The method, as in claim 10, wherein the digital image is derived from a color image.

12. The method, as in claim 1, wherein a representation for the bit block is selected from the group consisting of a 4-bit nibble, an 8-bit byte, a 16-bit unsigned short integer, a 32-bit unsigned short, and a 64-bit unsigned integer.

13. The method, as in claim 1, further comprising the step of:
producing a compressed image, the compressed image comprising the pixel values of changed pixels within the digital image, the compressed image comprising bit-blocks, each bit block including at least one bit set to the value indicative of the changed pixel within the corresponding pixel block.

14. The method, as in claim 13, wherein the compressed image further includes the base image.

15. The method, as in claim 1, further comprising the steps of:
choosing a representation for the bit block;
producing an output file using the representation for the bit block, the output file comprising the pixel values of changed pixels within the digital image, the output file comprising bit-blocks, each bit block including at least one bit set to the value indicative of the changed pixel within the corresponding pixel block, the output file having an output file size;
choosing an alternative representation for the bit block;
producing an alternative output file using the alternative representation for the bit block, the alternative output file comprising the pixel values of changed pixels within the digital image, the alternative output file comprising bit-blocks, each bit block including at least one bit set to the value indicative of the changed pixel within the corresponding pixel block, the alternative output file having an alternative output file size;
selecting the smaller of the output file size and the alternative output file size as the compressed image.

16. A method, comprising the steps of:
dividing at least a portion of a base image into pixel blocks;
coordinating a bit block with the pixel blocks;
finding a bit in the bit block set to the turned-on bit value, the turned-on bit value indicating the pixel block mapped to the bit includes one or more changed pixels;
updating the one or more changed pixels with changed pixel values; and
wherein the dividing, coordinating, finding, and updating steps of said method are performed using a digital computer.

17. The method, as in claim 16, wherein the pixel values of all of the pixels in the pixel block mapped to the turned-on bit are updated.

18. The method, as in claim 16, wherein the step of updating the one or more changed pixels with changed pixel values comprises the steps of:
coordinating one or more terminal bits with pixels within the pixel block, the one or more terminal bits are included within one or more terminal bytes; and
indicating the one or more changed pixels using one or more terminal bits having the turned-on bit value.

19. A computer readable media storing a computer program, wherein the computer program comprises instructions that when executed cause a computer to perform the steps of:
generating bit blocks, each bit block comprising one or more bits;
dividing a digital image into pixel-blocks, each pixel block including one or more pixels ;
mapping uniquely the bits to corresponding pixel blocks;
setting the bits to a value indicative of a changed pixel within the corresponding pixel block or to a value indicative of no changed pixel within the corresponding pixel block;
storing the pixel value of the changed pixel;
storing bit-blocks including at least one bit set to the value indicative of the changed pixel within the corresponding pixel block; and
discarding bit-blocks having all bits included therein set to the value indicative of the absence of a changed pixel within the corresponding pixel block.

20. The computer readable media, as in claim 19, wherein the computer program further comprises instructions that when executed cause a computer to perform the steps of:
generating a terminal byte, the terminal byte comprising one or more terminal bits;

mapping each terminal bit of the terminal byte uniquely to a corresponding pixel within the pixel block, the pixel block including a changed pixel;
setting each terminal bit of the terminal byte to a value indicative that the corresponding pixel is a changed pixel or to a value indicative that the corresponding pixel is not a changed pixel;
storing the terminal byte; and
storing the pixel value of the changed pixel.

* * * * *